(12) United States Patent
Netsu et al.

(10) Patent No.: US 10,455,107 B2
(45) Date of Patent: Oct. 22, 2019

(54) SCANNER HAVING A MERGING MARK AND WHITE REFERENCE TO CORRECT OUTPUT OF THE SENSOR CHIP

(71) Applicant: SEIKO EPSON CORPORATION, Tokyo (JP)

(72) Inventors: Takahiro Netsu, Nagano (JP); Toshifumi Sakai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/675,861

(22) Filed: Aug. 14, 2017

(65) Prior Publication Data

US 2018/0063358 A1    Mar. 1, 2018

(30) Foreign Application Priority Data

Aug. 29, 2016  (JP) ................. 2016-166558

(51) Int. Cl.
| | | |
|---|---|---|
| H04N 1/04 | (2006.01) | |
| H04N 1/12 | (2006.01) | |
| H04N 1/19 | (2006.01) | |
| H04N 1/193 | (2006.01) | |
| H04N 1/03 | (2006.01) | |

(52) U.S. Cl.
CPC ........... *H04N 1/0458* (2013.01); *H04N 1/03* (2013.01); *H04N 1/0301* (2013.01); *H04N 1/0306* (2013.01); *H04N 1/0405* (2013.01); *H04N 1/0423* (2013.01); *H04N 1/125* (2013.01); *H04N 1/1903* (2013.01); *H04N 1/1935* (2013.01)

(58) Field of Classification Search
CPC ...... H04N 1/0306; H04N 1/0458; H04N 1/03; H04N 1/1935; H04N 1/0405; H04N 1/125; H04N 1/0423; H04N 1/1903
See application file for complete search history.

(56) References Cited

U.S. PATENT DOCUMENTS

| | | | |
|---|---|---|---|
| 8,345,325 B2 | 1/2013 | Schmidt et al. | |
| 2010/0002273 A1* | 1/2010 | Schmidt | H04N 1/03 |
| | | | 358/475 |

FOREIGN PATENT DOCUMENTS

| | | | |
|---|---|---|---|
| EP | 2091223 A1 * | 8/2009 | ......... H04N 1/00018 |
| EP | 2091223 A1 | 8/2009 | |
| JP | 4864021 B2 | 1/2012 | |

OTHER PUBLICATIONS

The Extended European Search Report for the corresponding European Patent Application No. 17188427.3 dated Jan. 16, 2018.
Ami Semiconductor AMIS-710239-A3:200dpi CIS Module Data Sheet URL:http://pdf.eepw.com.cn/a20090804.
Ami Semiconductor AMIS710401-A4:400dpi CIS Module Data Sheet Red 600nm LED Light Source URL:http://pdf.dzsc.com/20090227/200902060249531001.pdf.

\* cited by examiner

*Primary Examiner* — Christopher Wait

(57) ABSTRACT

Provided is a scanner having sixteen or fewer sensor chips capable of scanning an A4 document; an optical unit that reduces and focuses an image of an A4 document on the sensor chips; and a generator that synthesizes images of the A4 document read by the sensor chips, and generates image data.

12 Claims, 7 Drawing Sheets

SCANNER HAVING A MERGING MARK AND WHITE REFERENCE TO CORRECT OUTPUT OF THE SENSOR CHIP

BACKGROUND

1. Technical Field

The present invention relates to a scanner.

2. Related Art

Technology for using multiple sensor chips to scan a document, synthesize output from each of the sensor chips, and generate image data is well known. JP Patent 4864021 and U.S. Pat. No. 8,345,325, for example, describe technology whereby a document is scanned by light from an image scanning area passing through a specific light guide and reaching multiple sensor chips.

The technology of the related art discloses a configuration for scanning a document using multiple sensor chips, but does not propose a suitable number of sensor chips to use. Configuring a scanner with numerous sensor chips increases the cost.

SUMMARY

An objective of the present invention is to provide a scanner having multiple sensor chips without using an excessively large number of sensor chips.

To achieve the foregoing objective, a scanner according to the invention has sixteen or fewer sensor chips for scanning A4 documents; an optical unit that reduces and focuses images of an A4 document on the sensor chips; and a generator that synthesizes images of the A4 document read by the sensor chips, and generates image data.

In a configuration that splits light from the document into multiple parts guided by the optical unit to the sensor chips, the maximum possible reduction by the optical unit is S/D where S is the document scanning resolution, and D is the resolution of the photoelectric conversion elements in the sensor chip. If reduction is to a value less than S/D, one pixel at document scanning resolution S cannot be resolved (read) by one photoelectric conversion element of the sensor chip, and that document scanning resolution is effectively meaningless.

Therefore, to achieve a document scanning resolution S, if the resolution of the sensor chip is fixed, the reduction ratio f at maximum reduction is f=S/D, and reduction ratio f must be greater (the absolute value must be greater) than S/D.

Suppose that the length of one line of the document (in the main scanning direction) is L inches; and the length in the line direction of the part of one sensor chip where the photoelectric conversion elements are disposed is d inches. To generate image data for one line in the line direction of the document from the output of multiple sensor chips, the same position of the document must be read overlapping at the ends of the multiple sensor chips, and the outputs of the sensor chips must be synthesized so that the same positions overlap.

As a result, only part of one sensor chip is used effectively to generate image data. Supposing scanning in an effective detection range equivalent to ratio $\alpha$ (<1) of the d inch size of the sensor chip in the line direction, the number of line sensors required to scan a document L inches wide is $Lf/d\alpha$, where f is the above reduction ratio S/D, and the maximum reduction ratio f of reduction by the optical unit is 1.

Using 8.3", which is the width of an A4 document (length is 11.7"), as the length L of one line, 1 as the maximum reduction ratio f, d=0.72 as the typical size a sensor chip, and a ratio $\alpha=2/3$, the number of line sensors $Lf/d\alpha$ required to scan an A4 document is approximately 17. Therefore, if the scanner is configured with fewer than 17, that is, 16 or fewer sensor chips, a scanner capable of scanning A4 documents with multiple line sensors can be configured without using excessive line sensors.

Likewise, the number of sensor chips required to scan an A3 document can be calculated by using 11.7" (which is the width of an A3 document (length is 16.5")) as the length L of one line, 1 as the maximum reduction ratio f, 0.72 as the typical size d of a sensor chip, and a ratio $\alpha=2/3$ as the ratio $\alpha$ for extra tolerance. To provide extra tolerance for skew to accommodate the size difference between an A4 document and an A3 document, the number of sensor chips is approximately 25. If the scanner is configured with fewer than 25, that is, 24 or fewer sensor chips, a scanner capable of scanning A3 documents with multiple sensor chips can be configured without using excessive sensor chips.

Other objects and attainments together with a fuller understanding of the invention will become apparent and appreciated by referring to the following description and claims taken in conjunction with the accompanying drawings.

DESCRIPTION OF EMBODIMENTS

Figure 1:
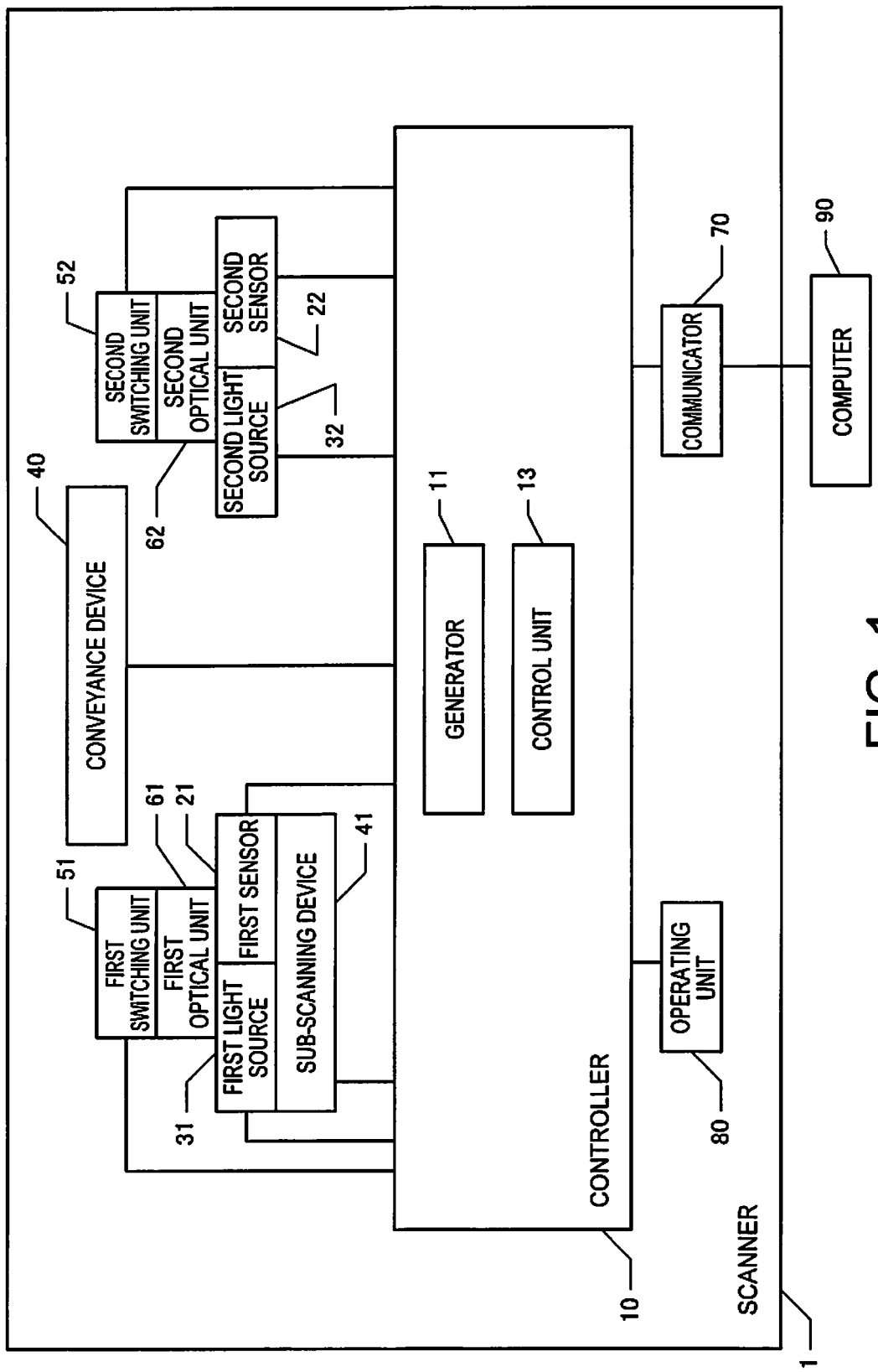
FIG. 1 is a block diagram of a scanner.

This embodiment of the invention is described in the following order.

(1) Scanner configuration
(2) Synthesizing output
(3) Line sensor configuration
(4) Scanning process
(5) Number of line sensors
(6) Other embodiments Note that the sensor chip is also referred to herein as simply a line sensor.

(1) Scanner Configuration

FIG. 1 is a block diagram of a scanner 1 according to this embodiment of the invention. The scanner 1 includes a controller 10, conveyance device 40, communicator 70, operating unit 80, computer 90, and a 2-channel scanning unit (including light source, sensor, and optical unit). The controller 10 includes a recording medium not shown, and a processor that reads and executes a program from the recording medium. The processor may be a CPU, an ASIC or other dedicated circuit device configured to execute specific processes. A CPU and ASIC may also work together. The processor may also be embodied by a single chip or multiple chips.

The controller 10 includes a generator 11 and a control unit 13, controls parts of the scanner 1 through the control unit 13, and generates image data by processes of the generator 11. The operating unit 80 includes an output unit that provides information to the user, and an input unit for receiving input from the user. The controller 10, by a function of the control unit 13, displays on the output unit information for selecting scanning conditions and instructing scanning, for example. Based on output from the output unit, the user can select scanning conditions and input start-scanning commands.

When a start-scanning command is input, the control unit 13 controls parts of the scanner 1 to execute the operations for scanning a document (such as conveying the document). When image data is output from the line sensor by this operation, the generator 11 generates image data. The communicator 70 is a device for communicating with an external device (an external computer 90 in this example), and the control unit 13 of the controller 10 can send desired information to the computer 90 and receive instructions and information from the computer 90.

In this embodiment of the invention, when the generator 11 of the controller 10 produces image data, the control unit 13 sends the image data through the communicator 70 to the computer 90. The image data may obviously be used in many ways, including being stored on a recording medium not shown of the scanner 1, stored on a removable recording medium, or sent through the communicator 70 to a device other than the computer 90.

The scanner 1 according to this embodiment has, not shown, both an automatic document feeder (ADF) and a scanning platen, and documents are scanned at the scanning position regardless of which is used. The scanner 1 according to this embodiment has a first scanning unit and a second scanning unit. The first scanning unit can scan both (the first side of) conveyed documents that are conveyed by the ADF, and placed documents that are placed by the user directly on the scanning platen. The second scanning unit scans the second side of conveyed documents, and cannot scan placed documents.

The first scanning unit includes, as shown in FIG. 1, a first sensor 21, first light source 31, sub-scanning device 41, first switching unit 51, and first optical unit 61. The sub-scanning device 41 is a device for moving the first sensor 21, first light source 31, and first optical unit 61 bidirectionally in the sub-scanning direction.

The second scanning unit includes, as shown in FIG. 1, a second sensor 22, second light source 32, second switching unit 52, and second optical unit 62, and does not have a device like the sub-scanning device 41. More specifically, the second sensor 22, second light source 32, second switching unit 52, and second optical unit 62 are stationary inside the scanner 1. Light from the second light source 32 is emitted to a specific position in the conveyance path of the conveyed document, and light from the conveyed document passes through the second optical unit 62 and is sensed by the second sensor 22 to image the document.

The first sensor 21 and second sensor 22 comprise multiple line sensors. Each line sensor is a sensor extending in a first direction, and comprises numerous photoelectric conversion elements arrayed in the first direction. In this embodiment, the direction in which the line sensors extend is perpendicular to the sub-scanning direction (the conveyance direction of a conveyed document). The direction in which the line sensors extend is referred to as the main scanning direction.

A photoelectric conversion element is a device that outputs a signal corresponding to the intensity of the received light, and in this embodiment are arranged at a resolution A (dpi, for example).

The first light source 31 and second light source 32 each have a lamp that emits light to a scanning area (exposure position) in the conveyance path of the conveyed document. When a document is scanned as a placed document, the exposure position moves in the sub-scanning direction. Light reflected from the object (document or white calibration plate, for example) located at the exposure position is received by the line sensors of the first sensor 21 or second sensor 22, and the line sensors generate signals corresponding to the amount of light received by each photoelectric conversion element.

The first sensor 21 and second sensor 22 have an analog front end, not shown. The analog front end includes a circuit that applies gain to the signals output by the photoelectric conversion elements according to the amount of light received, and an analog/digital conversion (ADC) circuit. The analog front end in this example also has a recording medium for recording information indicating the gain, and the analog front end, based on the gain information, adjusts the gain of the black level of the first sensor 21 and second sensor 22 to the lowest output value, and the white level to the highest output level.

The conveyance device 40 is a mechanism that conveys documents. The conveyance device 40 conveys the conveyed document to the exposure position for light from the first light source 31, and the exposure position for light from the second light source 32, and then conveys the conveyed document to the outside of the scanner 1.

Figure 2:
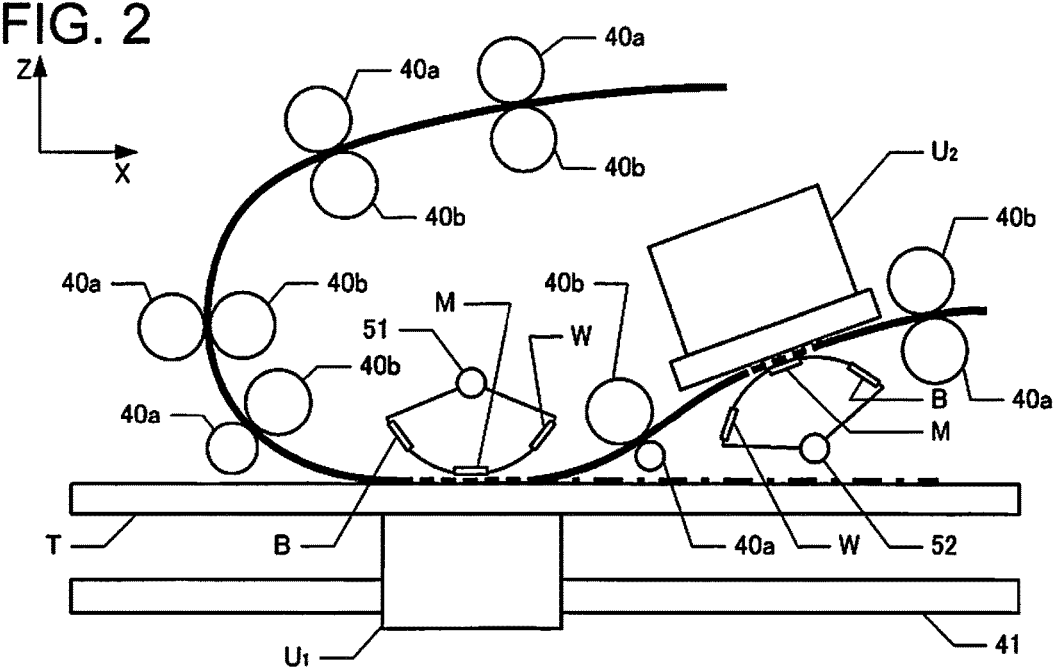
FIG. 2 illustrates the configuration around the conveyance mechanism of the scanner.

FIG. 2 schematically illustrates the conveyance path of the conveyance device 40. The conveyance path comprises plastic members not shown forming the path of the conveyed document, and a conveyed document is conveyed through the conveyance path by opposing conveyance rollers 40a, 40b disposed at multiple positions along the path. The conveyance path is described by the curve of the heavy solid line in FIG. 2. The exposure positions on the conveyance path are indicated by the dotted lines, and one line in the main scanning direction (direction perpendicular to the X-axis and Z-axis) is read at the exposure position by the first sensor 21 and second sensor 22.

Optical channels and switching units are disposed on both sides of the conveyance path with the exposure position therebetween. More specifically, the first sensor 21, first light source 31, and first optical unit 61 of the first scanning unit are housed in a first unit U1 shown in FIG. 2, and the first switching unit 51 is disposed above the scanning platen T with the exposure position between the first unit U1 and the first switching unit 51.

The first switching unit 51 extends in the main scanning direction, and comprises a pivot shaft extending in the main scanning direction, and a member that is fan-shaped in section on the X-Z plane. On the outside of the curve of the fan-shaped member are attached a white calibration plate W, black calibration plate B, and a merging mark plate M. The white calibration plate W, black calibration plate B, and merging mark plate M are rectangular members long in the main scanning direction, the rectangular surface long in the main scanning direction is exposed to the outside of the fan shape, and this surface is disposed perpendicularly to the radius of the curve.

The surface of the merging mark plate M exposed to the outside of the fan shape is the merging mark surface where a merging mark, which is the reference for identifying the same position on documents and synthesizing partial images, is formed.

The white calibration plate W is a white reference member for white level calibration, and the surface exposed to the outside of the fan shape is the white reference surface for calibrating white.

The black calibration plate B is a black reference member for black level calibration, and the surface exposed to the outside of the fan shape is the black reference surface for calibrating black.

The first switching unit 51 is connected to a motor or other drive source, and can be rotated on its pivot shaft. The white calibration plate W, black calibration plate B, and merging mark plate M can be set to the exposure position by the first switching unit 51 rotating on the shaft.

In the configuration shown in FIG. 2, the sub-scanning device 41 is a device capable of moving the first unit U1 bidirectionally on the sub-scanning direction (X-axis). When scanning a conveyed document, the sub-scanning device 41 sets the first unit U1 to a defined position as shown in FIG. 2. The document is scanned by the first unit U1 at this fixed position.

When scanning a placed document set on the scanning platen T, the sub-scanning device 41 moves the first sensor 21, first light source 31, and first optical unit 61 in the sub-scanning direction to scan the document. In the case of a placed document, therefore, the area indicated by the dotted line in FIG. 2 and the dot-dash line connected to the dotted line is the exposure position (the document scanning range).

The second sensor 22, second light source 32, and second optical unit 62 of the second scanning unit are disposed in the second unit U2 shown in FIG. 2, and the second switching unit 52 is disposed opposite the second unit U2 with the exposure position of the conveyance path in between. The second switching unit 52 is configured identically to the first switching unit 51, and by turning on the pivot shaft can position the white calibration plate W, black calibration plate B, and merging mark plate M to the exposure position. When scanning a conveyed document, one side (first side) is read by the first unit U1. The other side (second side) can be read by the second unit U2 when necessary.

The first optical unit 61 includes an optical member for reducing and focusing an image of the document on the first sensor 21. More specifically, the first optical unit 61 has an optical member forming an optical path guiding, to the line sensor, light reflected from the document as a result of the first light source 31 emitting light to the document. The optical path may be configured in many ways, and can be configured from combinations of various optical members, including an aperture, lenses, and mirrors.

Figure 3:
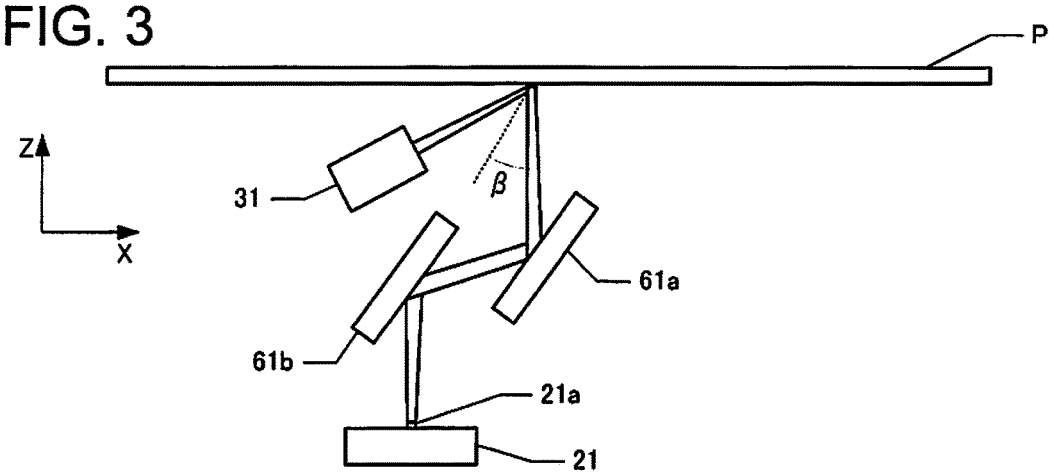
FIG. 3 illustrates an example of the configuration of the optical unit of the scanner.

FIG. 3 shows an example of an optical path as viewed parallel to the main scanning direction. The configuration in FIG. 3 includes the first light source 31 that emits light to the document P, first optical unit 61 (61a, 61b), and first sensor 21. The first optical unit 61 comprises two mirrors 61a, 61b, such as a plane mirror 61a and a concave mirror 61b, and guides the light of one line in the main scanning direction (perpendicular to the X-axis and Z-axis) of the document P to the line sensor 21a by splitting and reducing the light in the main scanning direction.

Figure 4:
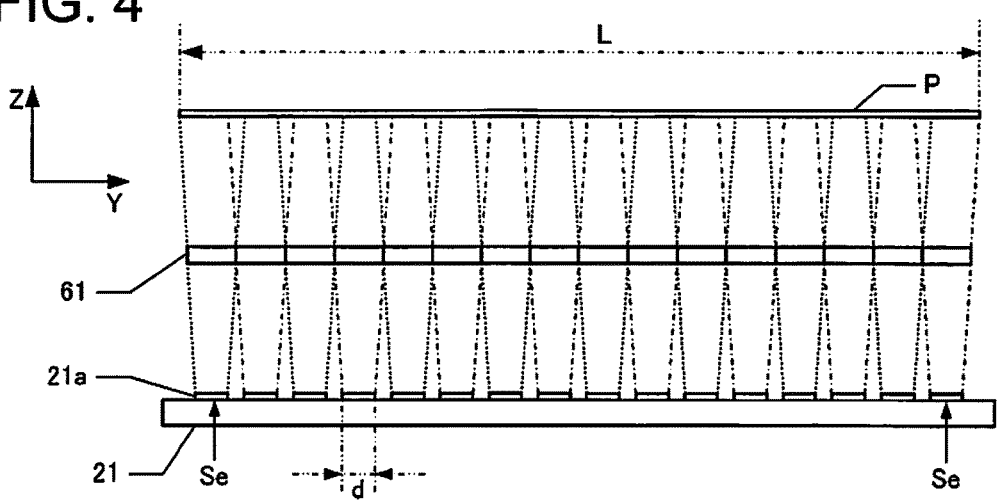
FIG. 4 schematically illustrates reduction by the optical unit.

FIG. 4 schematically illustrates the operation of the optical unit as seen parallel to the sub-scanning direction. In FIG. 4, light from the document P passes the first optical unit 61 and is guided to the line sensor 21a, and the path of light reflected from the document P is indicated schematically by the dotted lines and dot-dash lines. In other words, the line sensor 21a extends in the main scanning direction (Y-axis), and images of adjacent parts of the document P that partially overlap in the main scanning direction are reduced in the parts of the first optical unit 61 corresponding to those parts of the document P. The images from each part of the document P are then focused on the line sensor 21a corresponding to those parts.

Note that the dotted lines and dot-dash lines schematically illustrate the range of the optical path in FIG. 4, and the image can be reversed on the Y-axis by the first optical unit 61.

Like the first optical unit 61, the second optical unit 62 comprises optical members for reducing and focusing the document image on the second sensor 22. As described above, adjacent line sensors in the first sensor 21 and second sensor 22 in this embodiment read adjacent parts of the document P in the main scanning direction, and the adjacent line sensors are configured to read an image of the same position on the document P.

(2) Synthesizing Output

Because the line sensors overlap and read the same location on the document P, the generator 11 of the controller 10 generates image data in which the image data output by adjacent line sensors is synthesized where the image data partially overlap. More specifically, the generator 11 overlaps line sensor output based on the merging marks formed in the merging mark plate M surface of the merging mark plate M. More specifically, as shown in FIG. 4, the line sensor comprises multiple line sensors, and the individual line sensors are disposed at different positions.

Because the position of each line sensor can deviate from the design position due to manufacturing error, for example, the relative positions of the line sensors may deviate from the design positions. So that images can be merged to eliminate deviation of the line sensors from the design position, a merging position is first identified based on the merging mark. In other words, before scanning a document P, the generator 11 controls the first switching unit 51 (and the second switching unit 52 if scanning both sides) to set the merging mark to the exposure position.

Figure 5:
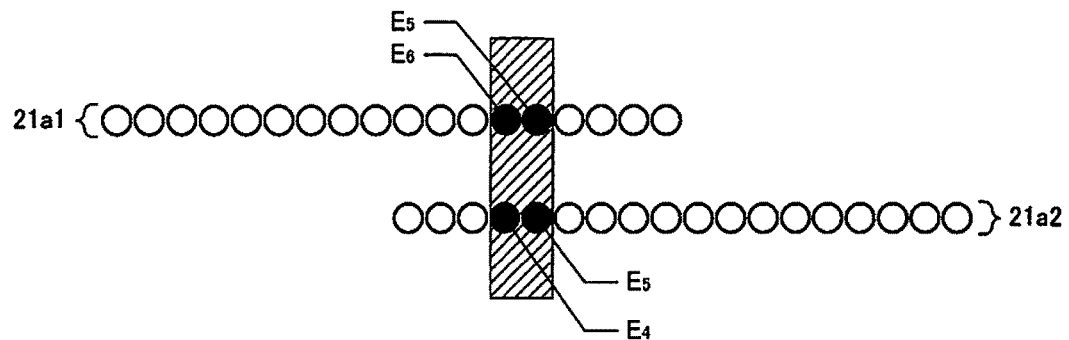
FIG. 5 illustrates image synthesis at maximum resolution.

The control unit 13 then turns the first light source 31 on. As a result, the line sensors 21a of the first sensor 21 output an image of the merging mark. FIG. 5 schematically illustrates the photoelectric conversion elements of the line sensor 21a, the black dots denoting the photoelectric conversion elements. In FIG. 5, the merging mark is a line extending in the sub-scanning direction, and parts of the merging mark surface other than the merging mark are white.

The merging mark is read by both of the adjacent line sensors 21a. In FIG. 5, the photoelectric conversion elements of the line sensors 21a that read the merging mark formed at the same position of the merging mark plate M are indicated by black dots, the merging mark is indicated by hatching, and the photoelectric conversion elements that read the merging mark are shown overlapping. One of the adjacent line sensors 21a is located on the top left side, and the other is located on the bottom right side, and the line sensors 21a are disposed so that the photoelectric conversion elements that read the merging mark are longitudinally aligned. One of the two adjacent line sensors 21a is referred to below as first line sensor 21a1, and the other as second line sensor 21a2.

The first line sensor 21a1 and second line sensor 21a2 output, as serial data, signals corresponding to the amount of light detected by the photoelectric conversion elements aligned in the main scanning direction. In this example, the generator 11 analyzes the output of the first line sensor 21a1, and determines that the fifth and sixth photoelectric conversion elements E5, E6 from the end detected the merging mark. The generator 11 also analyzes the output of the second line sensor 21a2, and determines that the fourth and fifth photoelectric conversion elements E4, E5 from the end detected the merging mark. In this case, the generator 11 determines that the fifth and sixth photoelectric conversion elements E5, E6 of the first line sensor 21a1, and the fourth and fifth photoelectric conversion elements E4, E5 of the second line sensor 21a2, read the same position, and in memory not shown stores the locations of the elements correlated to the line sensors.

The generator 11 applies the above process sequentially from the line sensor located at the end of the main scanning direction, and identifies the location of the photoelectric conversion elements that read the same position in each line sensor. Note that in the multiple line sensors of the line sensor 21a, all line sensors other than the line sensors at the ends will be both a first line sensor and a second line sensor. For example, if one line sensor is the first line sensor 21a1 and the adjacent line sensor is the second line sensor 21a2, when the second line sensor 21a2 is then treated as a first line sensor, the line sensor adjacent thereto on the opposite side as the first line sensor 21a1 is treated as the second line sensor.

Once the locations of the photoelectric conversion elements reading the same position are determined as described above, the next time a document P is scanned, the generator 11 can generate one line of image data by synthesizing the outputs of the line sensors based on their respective positions. A known method may be used for image synthesis. For example, assuming the output ai (here and below, the output after processing by shading correction, for example) of the photoelectric conversion element of the first line sensor 21a1 at position i (where i is a natural number from 1 to n), and the output bi of the photoelectric conversion element at position i of the second line sensor 21a2, are the outputs of photoelectric conversion elements for the same position, the synthesized pixel value $g_i$ for position i can be defined as $g_i = j_i a_i + k_i b_i$ where $j_i$ and $k_i$ are coefficients of $0 <= 1$, and the sum thereof is 1.

These coefficients may be constants, such as 0.5, regardless of position i, or may vary according to position i, such as the coefficient on the side closer to the center of the line sensor being greater than the coefficient on the side farther from the center.

In this example, the generator 11 can adjust, in units of one photoelectric conversion element, the synthesis position of the first image data the first line sensor 21a1 outputs and the second image data the second line sensor 21a2 outputs. Therefore, if the scanning resolution of the document is a scanning resolution corresponding to the resolution A of the photoelectric conversion elements (for example, is scanning resolution 2A if the reduction ratio of the optical unit is 1/2), the position where output data is synthesized can be adjusted in increments of one photoelectric conversion element appropriately to the position of the merging mark read by the photoelectric conversion elements, and the merging position can be accurately adjusted.

Figure 6:
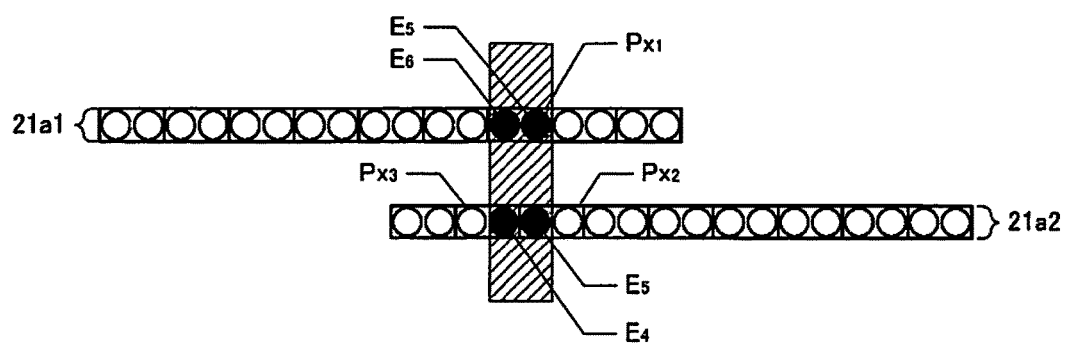
FIG. 6 illustrates image synthesis at a resolution lower than maximum resolution.

However, if the document is scanned at a scanning resolution lower than resolution A, such as a resolution A/n (where n is an integer of 2 or more), accurately synthesizing the image data may not be possible using a simple synthesizing method. FIG. 6 shows another example of reading the merging mark with the same photoelectric conversion elements used in the example in FIG. 5. In this example, when a document is scanned at a scanning resolution of A/2, the synthesizing position cannot be accurately adjusted by simply synthesizing outputs in groups of two from the ends of the first line sensor 21a1 and second line sensor 21a2.

More specifically, in FIG. 6 the two photoelectric conversion elements that are synthesized are enclosed in the rectangle, and the outputs of the fifth and sixth photoelectric conversion elements E5, E6 from the end of the first line sensor 21a1 are synthesized. However, the outputs of the fourth and fifth photoelectric conversion elements E4, E5 of the second line sensor 21a2 are not synthesized, and are output as values of different (discrete) pixels. As a result, if the synthesizing position is adjusted in this case, the position of pixel Px1 of first line sensor 21a1 can only be considered the position of pixel Px2 or pixel Px3 of second line sensor 21a2, and the outputs cannot be synthesized correctly. More specifically, if the position of the n photoelectric conversion elements of the second line sensor 21a2 that are synthesized is fixed (cannot be selected), the n photoelectric conversion elements in the second line sensor 21a2 will not necessarily be able to read the same part as the part that is read by the n photoelectric conversion elements in the first line sensor 21a1 (in most cases, will be offset).

(3) Line Sensor Configuration

The line sensors in this embodiment are configured so that, when scanning a document at a resolution of A/n (where n is a positive integer), the outputs of n photoelectric conversion elements at positions appropriate to the relative positions of the first line sensor 21a1 and second line sensor 21a2 can be synthesized. More specifically, in second line sensor 21a2, the position of the n photoelectric conversion elements that are synthesized in a regular cycle (loop) can be adjusted at the precision of 1 pixel of the line sensors.

When cyclically synthesizing the outputs of n adjacent photoelectric conversion elements, there are n ways of selecting the n photoelectric conversion elements. More specifically, if pattern 1 synthesizes n pixels from element 1 of the photoelectric conversion elements, and pattern 2 synthesizes n pixels from element 2 of the photoelectric conversion elements, there are n synthesizing patterns to pattern n synthesizing n pixels from element n of the photoelectric conversion elements that can be selected. Furthermore, because these patterns are offset from each other by one pixel (conversion element), if one of these patterns is selected, the position of the n elements that are combined can be adjusted at the precision of one photoelectric conversion element.

Figure 7:
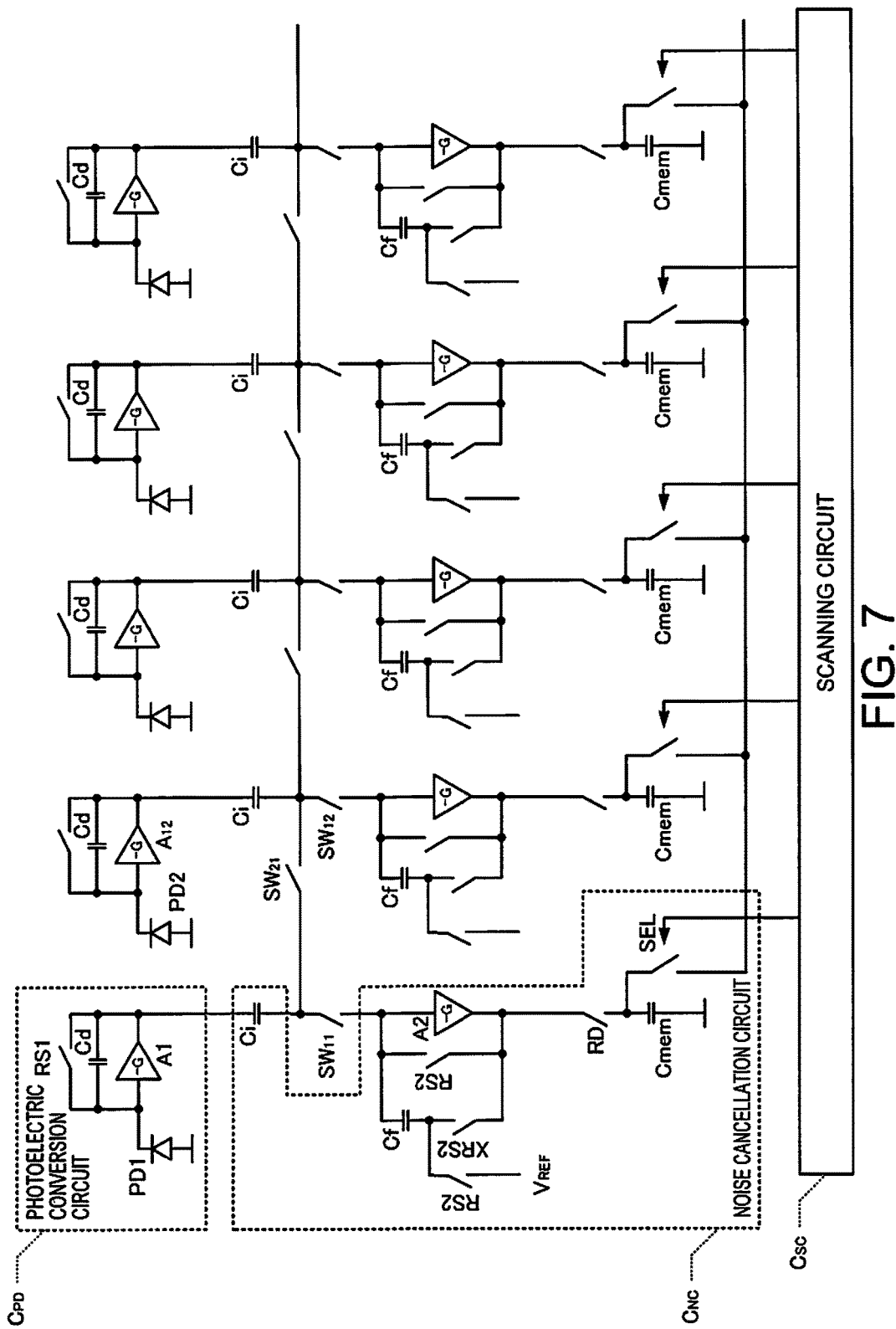
FIG. 7 shows an example of a line sensor circuit.

FIG. 7 shows the circuit configuration of the main part of the line sensor. The line sensor includes a photoelectric conversion circuit CPD comprising photoelectric conversion element PD1, a noise cancellation circuit CNC connected to the photoelectric conversion circuit CPD, and a scanning circuit CSC connected to the noise cancellation circuit CNC.

A photoelectric conversion circuit CPD and noise cancellation circuit CNC are provided for each of the multiple photoelectric conversion elements. The photoelectric conversion circuit CPD and noise cancellation circuit CNC corresponding to one photoelectric conversion element PD1 are described with reference to FIG. 7, but the configuration and operation of the photoelectric conversion circuit CPD and noise cancellation circuit CNC corresponding to the other photoelectric conversion elements PD1 are the same. Note that only five photoelectric conversion circuits CPD and noise cancellation circuits CNC are shown in FIG. 7, but the photoelectric conversion circuit CPD, noise cancellation circuit CNC, and switches on the right side in FIG. 7 repeat to the number of photoelectric conversion elements in the line sensor, and the scanning circuit also extends accordingly.

The photoelectric conversion circuit CPD comprises a photoelectric conversion element PD1, an inverting amplifier A1, capacitor Cd, and reset switch RS1. The photoelectric conversion element PD1 in this embodiment is a photodiode with the anode to ground and the cathode connected to the input terminal of the inverting amplifier A1. The inverting amplifier A1 outputs the inverted output of the photoelectric conversion element PD1 amplified –G times. This output is a voltage appropriate to the amount of light received by the photoelectric conversion element PD1, and is denoted output voltage Vs below.

The capacitor Cd is connected to the output terminal and the input terminal of the inverting amplifier A1. More specifically, the capacitor Cd functions as a feedback capacitor disposed in a signal feedback path from the output terminal to the input terminal of the inverting amplifier A1. The reset switch RS1 is connected to the output terminal and the input terminal of the inverting amplifier A1. The output from the inverting amplifier A1 can therefore be reset by turning the reset switch RS1 on and shorting the capacitor Cd. In this embodiment, before scanning, a reset signal is output from a drive circuit not shown as controlled by the control unit 13 to prepare for scanning by the reset signal turning the reset switch RS1 on.

The photoelectric conversion circuit CPD is connected to the noise cancellation circuit CNC. The noise cancellation circuit CNC includes a capacitor Ci, inverting amplifier A2, capacitor Cf, two reset switches RS2, and an inversion switch XRS2.

A first switch SW11 is connected to the input terminal of the inverting amplifier A2 and capacitor Ci. The inverting amplifier A2 outputs the inverted output of the photoelectric conversion element PD1 amplified –G times.

Capacitor Cf and inversion switch XRS2 are connected in series, one terminal of the capacitor Cf connected to the input terminal of the inverting amplifier A2, and one terminal of the inversion switch XRS2 connected to the output terminal of the inverting amplifier A2. One reset switch RS2 is connected between capacitor Cf and inversion switch XRS2, and reference voltage VREF is applied to the other side of the reset switch RS2. The other reset switch RS2 is connected to the output terminal and input terminal of the inverting amplifier A2.

In this embodiment, the signal controlling turning the inversion switch XRS2 on/off is the inverse of the signal controlling the on/off state of the reset switch RS2. Therefore, when the reset switch RS2 is on, the inversion switch XRS2 is off, and when the reset switch RS2 is off, the inversion switch XRS2 is on.

When the reset switch RS2 is off and the inversion switch XRS2 is on, capacitor Cf functions as a feedback capacitance disposed in the signal feedback path from the output terminal to the input terminal of the inverting amplifier A2.

When the reset switch RS2 is on and the inversion switch XRS2 is off, the path between the input and output of the inverting amplifier A2 is shorted. In this case, capacitor Cf is between a terminal of voltage Vt and the reference voltage VREF. In this case, if the input terminal of the inverting amplifier A2 is voltage Vt, a potential difference of Vt−VREF occurs between the ends of the capacitor Cf, and a charge corresponding to this potential difference is stored (reset).

This circuit cancels noise in the output voltage Vs of the photoelectric conversion circuit CPD by the capacitor Ci while inverting and amplifying the output voltage Vs by the inverting amplifier A2, and the noise cancellation circuit CNC therefore functions as a CDS (Correlated Double Sampling) circuit. When first switch SW11 is on and second switch SW21 described below is off, the output voltage VCDS of the inverting amplifier A2 is VCDS VREF−(CI/CF)*ΔVs, where CI is the capacitance of capacitor Ci, CF is the capacitance of capacitor Cf, and ΔVs is the change in the output voltage Vs of the inverting amplifier A1 during the exposure time of the photoelectric conversion element PD1.

The output terminal of the inverting amplifier A2 is connected to read switch RD, and the other terminal of the read switch RD is connected to capacitor Cmem and selector switch SEL. The other terminal of capacitor Cmem goes to ground, and the selector switch SEL is connected to the output terminal of the line sensor.

The read switch RD turns on at the timing for reading the output of the photoelectric conversion element PD1, and when the read switch RD is on, a charge corresponding to the output voltage of the inverting amplifier A2 is stored in capacitor Cmem. When the read switch RD then turns off, and the selector switch SEL is turned on by the scanning circuit CSC, the charge in capacitor Cmem is read from the output terminal of the line sensor.

As described above, a photoelectric conversion circuit CPD and noise cancellation circuit CNC are provided for each photoelectric conversion element PD1 of the line sensor. The noise cancellation circuits CNC are arranged in the order of the photoelectric conversion elements PD1.

The scanning circuit CSC has a signal bus for turning the selector switch SEL in each noise cancellation circuit CNC on/off. When the read switch RD turns on, as controlled by the control unit 13, a charge can be stored in the capacitor Cmem corresponding to each photoelectric conversion element PD1; and when the read switch RD turns off, the scanning circuit CSC turns the selector switches SEL on one at a time in the order of the photoelectric conversion elements PD1 as controlled by the control unit 13, and then turns the selector switches SEL off after a specific time. As a result, image data corresponding to the amount of light received by each photoelectric conversion element PD1 of the line sensor is output, and the outputs are acquired by the generator 11.

In this example, a second switch SW21 is connected between the photoelectric conversion element PD1 and first switch SW11. Note that in the example shown in FIG. 7 the second switch SW21 is connected between capacitor Ci and first switch SW11, but if the capacitor, amplifier, and waveshaping circuits are ignored, the second switch SW21 may be seen as being connected between the photoelectric conversion element PD1 and first switch SW11 (here and below).

As described above, the photoelectric conversion element PD1 and second switch SW21 are connected through capacitor Ci in this example, and first switch SW11 and second switch SW21 are connected directly without going through capacitor Ci. This relationship is sufficient for the first switches and second switches corresponding to the multiple photoelectric conversion elements. This configuration also enables controlling the line through which the charge of the capacitor Ci flows by means of the first switch and second switch.

Because one first switch SW11 corresponds to one photoelectric conversion element PD1 in this embodiment, the photoelectric conversion element PD1 and first switch SW11 may be thought of as a set. For example, if a photoelectric conversion element PD1 and first switch SW11 shown in FIG. 7 are a set, then the adjacent photoelectric conversion element PD2 is part of a similar set comprising a photoelectric conversion element PD2 and a first switch SW12. The second switch SW21 is located between one set and the adjacent set, and is connected between the photoelectric conversion element PD and first switch SW in each set. The second switch SW21 thus connects photoelectric conversion element and first switch pairs, and all second switches SW21 are connected in series.

The configuration described above enables the line sensors to synthesize the output of photoelectric conversion elements at desired adjacent positions. More specifically, the control unit 13, by controlling a drive circuit not shown to control the switches of the line sensor, can select the photoelectric conversion elements to be synthesized, and select the capacitor Cmem to which the synthesized output is output. More specifically, when the second switch is off, the outputs of the photoelectric conversion elements are independent of each other because the pairs of photoelectric conversion elements and first switches are mutually independent. Furthermore, because each photoelectric conversion element is connected through a first switch to the scanning circuit CSC in this embodiment, whether or not the output of the photoelectric conversion element reaches the scanning circuit CSC can be controlled by controlling the on/off state of the first switch.

Therefore, to scan at a resolution A/n, the control unit 13 turns on the first switch corresponding to one of the photoelectric conversion elements to synthesize, and turns off the first switch corresponding to other photoelectric conversion elements. For example, if n=2 in the example in FIG. 7, that is, the output of two adjacent photoelectric conversion elements is merged, if first switch SW11 turns on and first switch SW12 turns off, voltage is input to the noise cancellation circuit CNC corresponding to the photoelectric conversion element PD1, and voltage is not input to the noise cancellation circuit CNC corresponding to photoelectric conversion element PD2. As a result, the noise cancellation circuit CNC corresponding to photoelectric conversion element PD1 functions, and the noise cancellation circuit CNC corresponding to photoelectric conversion element PD2 does not function.

Because the second switch connects photoelectric conversion element and first switch sets, when the second switch turns on, the output terminal of the photoelectric conversion circuit CPD of the adjacent set is energized. The control unit 13 then turns on the second switch connecting the outputs of the photoelectric conversion elements to be synthesized, and turns off the second switches connecting the outputs of photoelectric conversion elements that are not synthesized. If only one of the specific first switches paired with the photoelectric conversion elements being synthesized turns on, the outputs of the photoelectric conversion circuit CPD corresponding to the photoelectric conversion elements to synthesize are combined, and can be processed by a specific noise cancellation circuit CNC (which cancels noise and outputs using capacitor Cmem).

For example, if first switch SW11 is on, first switch SW12 is off, and second switch SW21 turns on, the outputs of photoelectric conversion element PD1 and PD2 are synthesized and processed by one noise cancellation circuit CNC. In this case, the output of one noise cancellation circuit CNC is $VCDS=VREF-(CI/CF)*(\Delta Vs1+\Delta Vs2)$, where CI is the capacitance of capacitor Ci, CF is the capacitance of capacitor Cf, $\Delta Vs1$ is the change in the output voltage Vs of inverting amplifier A1 during the exposure time of photoelectric conversion element PD1, and $\Delta Vs2$ is the change in the output voltage of the inverting amplifier A12 during the exposure time of photoelectric conversion element PD2. Note that the capacitance of the capacitor Ci corresponding to the adjacent photoelectric conversion element is the same in all capacitors Ci, and the capacitance of capacitor Cf is the same in all capacitors Cf.

The control unit 13, using a drive circuit not shown, repeats control turning on the second switches connecting n sets adjacent to the elements to synthesize, turning off the other second switches, turning on one first switch corresponding to the n adjacent elements to synthesize, and turning off the other first switches, inn loops through the switches of each circuit corresponding to the photoelectric conversion elements arrayed in the main scanning direction. As a result, output of resolution A/n can be achieved.

Figure 8:
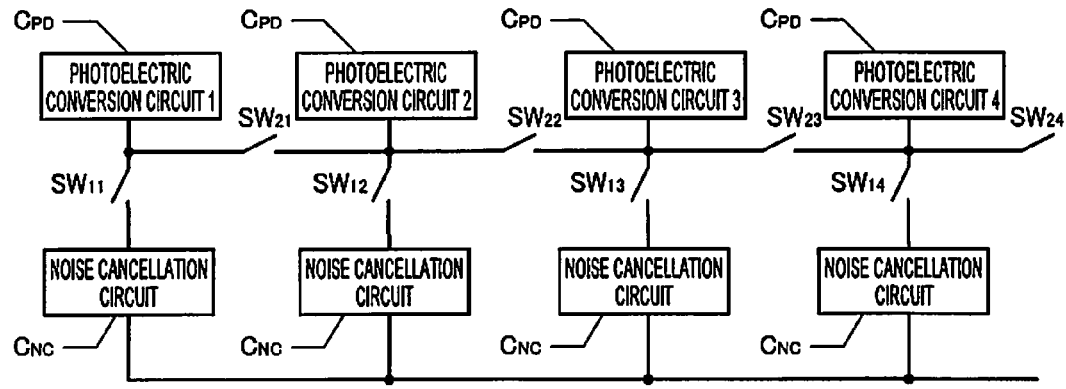
FIG. 8 illustrates switch control of image synthesis.

This method of control enables selecting the first of the n photoelectric conversion elements to merge from a desired position. More specifically, a line sensor according to this embodiment is configured so that photoelectric conversion element outputs can be synthesized and output inn loops from photoelectric conversion element m (where m is a value from 1 to n). FIG. 8 shows a simplified version of the circuit diagram in FIG. 7 focusing on the relationship between the circuits, first switches, and second switches, and a table illustrating the operation of the switches at different scanning resolutions. In the table in FIG. 8, the on/off cycle in the main scanning direction is indicated by the bold rectangles.

The photoelectric conversion elements of the line sensor are disposed at resolution A. As shown in the table in FIG. 8, to scan a document in cycles (sets) of 1 photoelectric conversion element from the first element of the line sensor, the control unit 13, through a drive circuit, turns the first switch SW11 and second switch SW21 on and off, respectively, and repeats these switch settings in the main scanning direction. As a result, the output of each photoelectric conversion element in the photoelectric conversion circuit CPD is output with out being merged with the output of another photoelectric conversion element (which may be interpreted as being merged in a cycle of 1 from the first element), and the document is scanned at resolution A.

As shown in line 2 in the table in FIG. 8, to scan a document in cycles of 2 photoelectric conversion elements from the first element of the line sensor, the control unit 13, through a drive circuit, turns the first switch SW11, second switch SW21, first switch SW12, second switch SW22 on, on, off, off, respectively, and repeats these switch settings in the main scanning direction. As a result, the outputs of the photoelectric conversion elements are merged and output in loops of 2 elements from the first photoelectric conversion element in the photoelectric conversion circuit CPD, and scanning is done at resolution A/2.

As shown in line 3 in the table in FIG. 8, to scan a document in cycles of 3 photoelectric conversion elements from the first element of the line sensor, the control unit 13, through a drive circuit, turns the first switch SW11, second switch SW21, first switch SW12, second switch SW22, first switch SW13, second switch SW23 on, on, off, on, off, off, respectively, and repeats these switch settings in the main scanning direction. As a result, the outputs of the photoelectric conversion elements are synthesized and output in a cycle of 3 elements from the first photoelectric conversion element in the photoelectric conversion circuit CPD, and scanning is done at resolution A/3.

As shown in line 4 in the table in FIG. 8, to scan a document in cycles of 4 photoelectric conversion elements from the first element of the line sensor, the control unit 13, through a drive circuit, turns the first switch SW11, second switch SW21, first switch SW12, second switch SW22, first switch SW13, second switch SW23, first switch SW14, and second switch SW24 on, on, off, on, off, on, off, off, respectively, and repeats these switch settings in the main scanning direction. As a result, the outputs of the photoelectric conversion elements are synthesized and output in a cycle of 4 elements from the first photoelectric conversion element in the photoelectric conversion circuit CPD, and scanning is done at resolution A/4.

When merging the output of photoelectric conversion elements in sets of a desired n elements, this embodiment also enables selecting the photoelectric conversion element to use as the starting point (element 1) in the cycle of n elements. For example, as shown in line 5 in the table in FIG. 8, the control unit 13, through a drive circuit, turns the first switch SW11, second switch SW21, first switch SW12, second switch SW22, first switch SW13, and second switch SW23 off, off, on, on, off, off, and except for the switches (first switch SW11, second switch SW21) corresponding to the first photoelectric conversion element, repeats setting the first switch SW12, second switch SW22, first switch SW13, second switch SW23 in the main scanning direction. As a result, the outputs of the photoelectric conversion elements are synthesized and output in a cycle of 2 elements from the second photoelectric conversion element in the photoelectric conversion circuit CPD, and scanning is done at resolution A/2.

Through a similar process, the control unit 13 can synthesize the outputs of photoelectric conversion elements in groups of n elements starting from a desired element m, and outputs the synthesized results as the output of the line sensor. The control unit 13 can therefore adjust the position of the n elements synthesized at the precision of one element of the line sensor.

Figure 9:
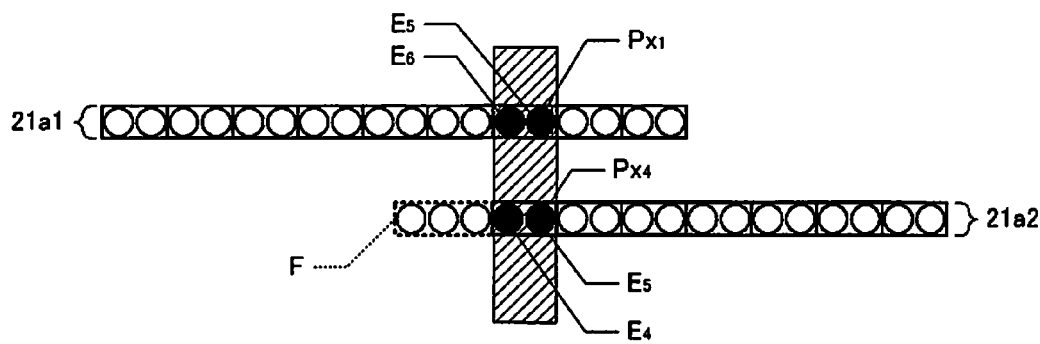
FIG. 9 illustrates image synthesis at a resolution lower than maximum resolution.

As a result, data read by different line sensors from the same position of the document can be adjusted to overlap at the precision of one element of the line sensor. FIG. 9 illustrates a merging mark scanned by the same photoelectric conversion elements as in the example in FIG. 5. In this example, to scan a document with the resolution of the photoelectric conversion elements A/2, if the photoelectric conversion elements are synthesized in sets of two from the end of the first line sensor 21a1, one synthesized pixel (Px1) contains the merging mark, and the merging mark is not contained in the other pixel.

However, if outputs are synthesized in sets of two from the end of second line sensor 21a2 as shown in FIG. 6, the merging mark is contained in pixel Px2 and pixel Px3, and the output of first line sensor 21a1 and the output of second line sensor 21a2 cannot be accurately synthesized. In other words, in the example shown in FIG. 6, the outputs of n photoelectric conversion elements at a position corresponding to the relative positions of first line sensor 21a1 and second line sensor 21a2 cannot be synthesized.

However, this embodiment of the invention enables desirably selecting the position of the n photoelectric conversion elements to synthesize. In the example shown in FIG. 9, the control unit 13 controls the first switch and second switch to synthesize the outputs in sets of 2 starting from the photoelectric conversion element E4 fourth from the end of the second line sensor 21a2. As a result, in second line sensor 21a2, the outputs of the photoelectric conversion elements can be synthesized in the sets indicated by the solid line rectangles in FIG. 9, and the synthesized result can be output with the results of reading the merging mark being contained in only one pixel Px4.

As described above, if the control unit 13 controls the switches of the second line sensor so that the outputs of n photoelectric conversion elements at positions corresponding to the relative positions of the first line sensor and second line sensor are synthesized and output, the synthesized result of the n photoelectric conversion elements that can be synthesized without producing an offset is output from the line sensor. The generator 11 then synthesizes the line images based on the outputs of the line sensors when the merging mark surface is at the exposure position. More specifically, to scan a document when the resolution of the photoelectric conversion elements is A/n, the first switching unit 51 is controlled and the output of first sensor 21 at resolution A is acquired with the merging mark at the exposure position as controlled by the control unit 13 before the document is scanned. Based on this output, the generator identifies the pixels that read the same merging mark in each line sensor.

The generator 11 synthesizes the image data output from the first sensor when a document is read so that the pixels reading the same merging mark overlap. For example, using the example in FIG. 9, the process of superimposing the output of first line sensor 21a1 and the output of second line sensor 21a2 so that pixel Px1 and pixel Px4 are superimposed is executed for each line sensor. By applying this process to each of the multiple line sensors, the generator 11 generates image data for one line.

In a line sensor having multiple photoelectric conversion elements, and a σψντηεσιζινγ χιρχυιτ such as shown in FIG. 7 that merges the output of a selected photoelectric conversion element with the output of a photoelectric conversion element adjacent to the selected photoelectric conversion element, this embodiment of the invention can be understood as a configuration in which the σψντηεσιζινγ χιρχυιτ merges and outputs the outputs of consecutive n photoelectric conversion elements at a position based on a control signal received from an external device (control unit 13).

If the first line sensor or second line sensor is disposed to the circuit board at positions deviating from the design position, the deviation can be cancelled and outputs synthesized accurately. As a result, the image quality of image data combining the output of multiple line sensors can be improved.

When scanning a document with the resolution of the photoelectric conversion elements A/n, the generator 11 in this embodiment of the invention does not use, to generate the image data, the output of the photoelectric conversion elements located between the n photoelectric conversion elements at a position appropriate to the relative positions of the line sensors, and the end of the second line sensor closest to that position. For example, in the example in FIG. 9, photoelectric conversion elements E4, E5 of the second line sensor 21a2 are the n (2) photoelectric conversion elements at the position appropriate to the relative positions of the first line sensor 21a1 and second line sensor 21a2. Therefore, to generate the image data, the generator 11 does not use the three photoelectric conversion elements (the photoelectric conversion elements surrounded by the dotted rectangle) located between the n photoelectric conversion elements E4, E5 of the second line sensor 21a2, and the end F of the second line sensor 21a2 closest to the position of photoelectric conversion elements E4, E5.

In other words, when synthesizing the outputs of n photoelectric conversion elements appropriate to the relative positions of the first line sensor 21a1 and second line sensor 21a2 (when merging pixel Px1 and pixel Px4), there is no need to use the photoelectric conversion elements, shown in the dotted rectangle, that are closer to the end (the nearest end) of the second line sensor than the n elements at the position appropriate to the relative positions. Therefore, in this embodiment of the invention, when merging first image data output by the first line sensor 21a1 and second image data output by the second line sensor 21a2, the generator 11 does not use the output of the photoelectric conversion elements enclosed in the dotted rectangle shown in FIG. 9. This configuration enables synthesizing outputs without using unnecessary outputs. Note that the photoelectric conversion elements from which the output is not used may change according to the value of n even if the relative positions are the same. As a result, which photoelectric conversion elements are not used must be determined according to the relative positions and n.

Note that because the outputs of the photoelectric conversion elements in the dotted rectangles are not used, a reset is preferably executed to prevent unnecessary charge accumulation during the scanning process. A configuration in which one electrode of the capacitor goes to ground may obviously also be used to prevent unnecessary charge accumulation in the scanning process. Not using the output of a photoelectric conversion element can also be accomplished by, for example, not outputting the output of the photoelectric conversion element to the scanning circuit CSC, or outputting the output of the photoelectric conversion element to the scanning circuit CSC and the generator 11 discarding the output.

(4) Scanning Process

Figure 10:
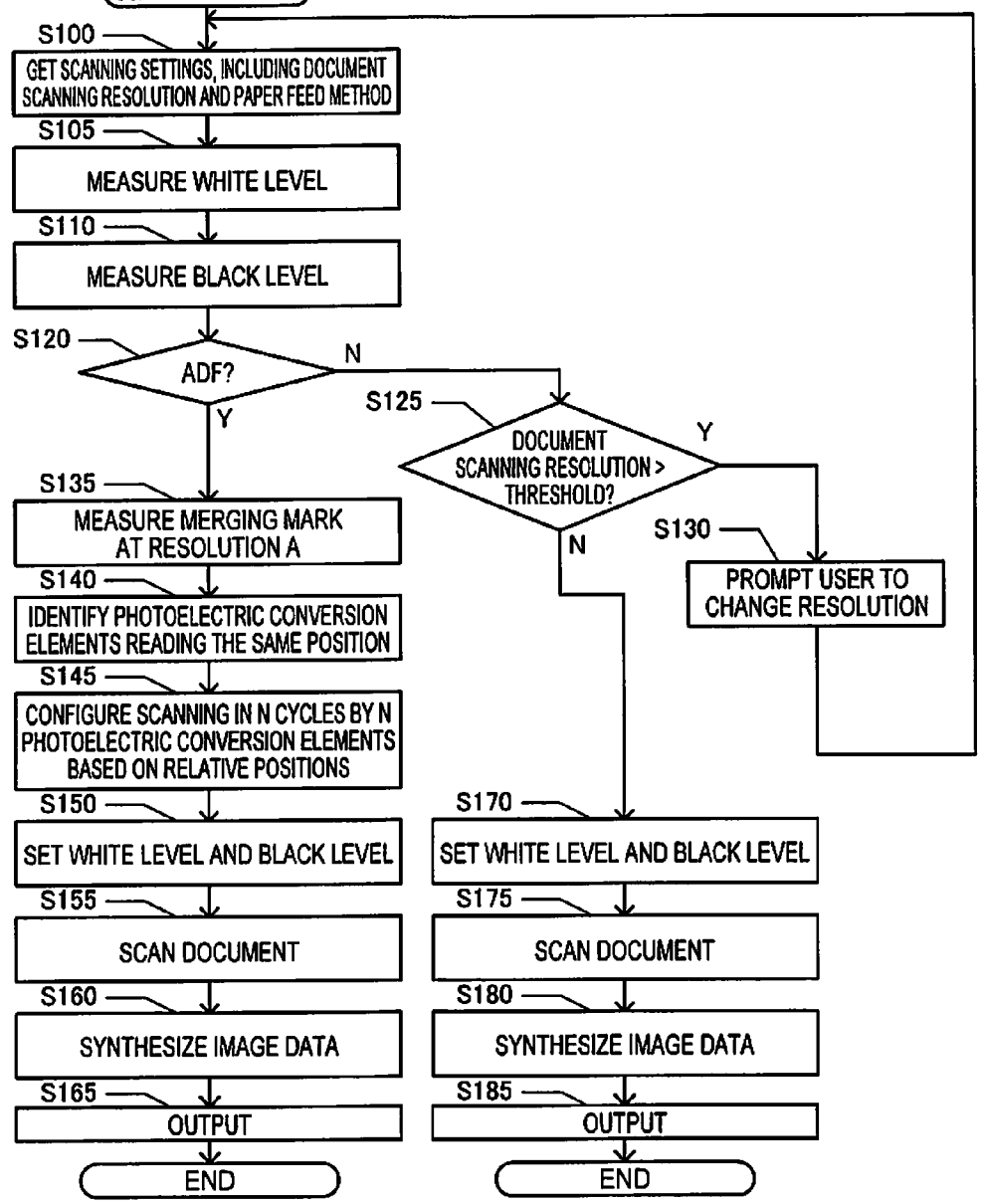
FIG. 10 is a flow chart of the scanning process.

Steps in the scanning process are described next with reference to the flow chart in FIG. 10. When the user directly or indirectly specifies, through the operating unit 80, the document scanning resolution and paper feed method (ADF or document platen), and instructs scanning, the controller 10 receives the scan command by a function of the control unit 13, and starts the scanning process shown in FIG. 4. When the scanning process starts, the control unit 13 gets the scanning settings, including the document scanning resolution and the paper feed method (step S100). Note that in this example the user can select and set the desired resolution from among the plural document scanning resolutions that can be set for reading light reflected from a conveyed document.

Next, the control unit 13 measures image shading. More specifically, the lowest level of light detectable by the line sensor is the black level, and the highest level of detectable light is the white level, but the black level and white level can vary according to the sensor, light source, and other characteristics. For example, sensor characteristics may vary due to noise such as dark current, sensor manufacturing errors, and aging, and the black level and white level can vary according to such variations. Therefore, to scan with high quality, imaging shading is preferably measured before reading a document to determine at least one of the black level and white level.

Figure 11:
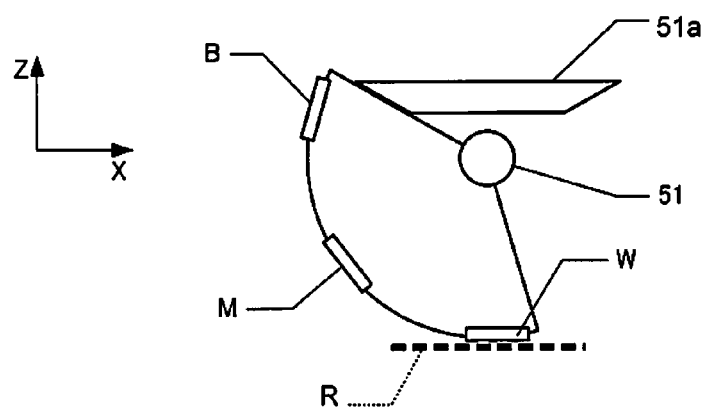
FIG. 11 illustrates operation of the switching unit.

The control unit 13 in this example first measures the white level (step S105). More specifically, before reading the document, the control unit 13 controls the first switching unit 51 (and the second switching unit 52 for duplex scanning) to set the white calibration plate W to the exposure position. FIG. 11 shows the first switching unit 51 and a stopper 51a (not shown in FIG. 2) disposed nearby. As shown in FIG. 11, a stopper 51a that contacts a radial portion of the fan-shaped member and limits rotation of the first switching unit 51 is disposed in the range of rotation of the first switching unit 51 (and second switching unit 52). The stopper 51a is stationary inside the case of the scanner 1.

When the stopper 51a is configured to limit rotation of the first switching unit 51 when the white calibration plate W is set to the exposure position R as shown in FIG. 11, and when the first switching unit 51 rotates to the opposite side as shown in FIG. 11 and the black calibration plate B is at the exposure position R. The control unit 13 turns the first switching unit 51 clockwise as shown in FIG. 11 until the first switching unit 51 contacts the stopper 51a. When the white calibration plate W is at the exposure position R, the control unit 13 controls the first light source 31 to emit light to the white calibration plate W. As a result, output indicating the result of measuring the white calibration plate W is acquired from the first sensor 21, and the control unit 13 acquires the output as the white level.

Next, the control unit 13 measures the black level (step S110). More specifically, before reading the document, the control unit 13 controls the first switching unit 51 (and the second switching unit 52 for duplex scanning) to set the black calibration plate B to the exposure position. More specifically, the control unit 13 turns the first switching unit 51 counter-clockwise as shown in FIG. 11 until the first switching unit 51 contacts the stopper 51a. When the black calibration plate B is at the exposure position R, the control unit 13 controls the first light source 31 to emit light to the black calibration plate B. As a result, output indicating the result of measuring the black calibration plate B is acquired from the first sensor 21, and the control unit 13 acquires the output as the black level.

Next, the control unit 13 determines if the paper feed method is by ADF (step S120). More specifically, the control unit 13 references the scanning settings acquired in step S100 to determine if the paper feed method is by ADF or using the scanning platen so that, when reading light from a placed document, the document can be read by a method that is less affected by deviations from the direction perpendicular to the document surface than when reading light from a conveyed document. The types of documents that can be conveyed by the conveyance device 40 in this embodiment are limited, and only single-sheet documents can be scanned using the conveyance device 40. More types of documents can be scanned using the platen glass, however, because each time a document is scanned, the user manually places the document on the platen and then removes the document from the platen after scanning. For example, when the document is placed on the platen, the document can be scanned whether the document is a single sheet or an open page in a bound book or document.

However, because there is greater diversity in the types of documents that may be scanned as a placed document on the scanning platen, depending on the type of placed document, at least part of the document may be vertically separated from the platen surface, that is, not in contact with the platen surface. As a result, when a document is placed at the exposure position to which light from the light source is emitted, the vertical offset (deviation) from the platen surface may be greater when a placed document is set on the scanning platen than when a conveyed document is conveyed to the exposure position by the conveyance mechanism. Therefore, this embodiment of the invention uses a scanning method whereby the effect of vertical separation from the platen surface is less when reading light from a placed document than when reading light from a conveyed document.

The method of scanning a placed document may be any desired method that reduces the effect of perpendicular separation of the document from the scanning platen compared with the method of reading light from a conveyed document. For example, a method whereby deviation of the document in the direction perpendicular to the scanning platen is a method whereby the drop in image quality is small when there is deviation perpendicularly to the scanning platen, and may be any method that can suppress a loss of image quality due to such deviation.

If the paper feed method is determined to not be by ADF in step S120, that is, if the document is manually placed on the scanning platen, the control unit 13 determines if the scanning resolution of the document is greater than a set threshold (step S125). In this embodiment, a predefined number of resolutions k (where k is an integer of 2 or more) can be selected. That is, if the resolution of the photoelectric conversion elements of the line sensors in the first sensor 21 and second sensor 22 is A, resolutions of A/n can be used by merging the outputs of n adjacent photoelectric conversion elements.

This embodiment of the invention therefore enables selecting, as the document scanning resolution, a resolution acquired by multiplying the resolution A, A/2 . . . A/k acquired by substituting an integer of 1 to k (where k=4 in this example) for n, by the reduction ratio f of the first optical unit 61 (and second optical unit 62).

For example, if the resolution A of the photoelectric conversion elements is 1200 dpi, and k is 4, resolutions of 1200 dpi, 600 dpi, 400 dpi, 300 dpi can be selected as the scanning resolution of the line sensors. In this case, if the reduction ratio f is 1/2, the document scanning resolutions that can be selected are 600 dpi, 300 dpi, 200 dpi, 150 dpi, respectively.

The resolutions selectable as the document scanning resolution in this embodiment also differ according to the paper feed method. More specifically, the highest resolution that can be set by the user when reading light from a placed document set on the scanning platen is lower than the highest resolution that can be set by the user when reading light from a conveyed document. For example, if the highest resolution that can be set when reading light from a conveyed document by the line sensors is 600 dpi or less, the highest resolution that can be set when reading light from a placed document is 300 dpi or less.

The highest document scanning resolution that can be selected for a placed document is previously set as a threshold. The control unit 13 references the scanning settings acquired in step S100, and determines if the document scanning resolution specified by the user is a resolution exceeding the threshold. In step S125, if the document scanning resolution specified by the user is a resolution above the threshold, the control unit 13 prompts the user to change the document scanning resolution (step S130). More specifically, the control unit 13 displays a message on the operating unit 80 instructing setting a document scanning resolution below the threshold, receives the input of a new document scanning resolution from the operating unit 80, and repeats the process from step S100. The message may also suggest loading the document in the ADF.

In step S125, if the document scanning resolution specified by the user is not determined to be a resolution exceeding the threshold, the control unit 13 proceeds with document scanning from step S170 (a second process executed when scanning a placed document).

If in step S120 the paper feed method is determined to be by ADF, the user has already specified a scanning resolution enabling reading light from a conveyed document, and the scanning process proceeds without determining if the document scanning resolution exceeds the threshold as in step S125. Therefore, in this embodiment of the invention, the maximum document scanning resolution that can be used when scanning a placed document is lower than the maximum resolution that can be used when scanning a conveyed document. As a result, scanning a placed document uses a method that reduces the effect of separation of the document in the direction perpendicular to the scanning platen compared with when scanning a conveyed document. Technology suitable to using a scanner having both a conveyance mechanism and a scanning platen can therefore be provided.

More specifically, when a placed document is offset vertically to the platen surface from a reference position, light offset horizontally to the platen surface an amount corresponding to the vertical offset from the platen surface must be read to read the light reflected from the document at an angle to the platen surface. However, if the scanning resolution is low, the deviation will be substantially indiscernible in the scanned image if the horizontal deviation to the platen surface is within the range of one pixel.

Furthermore, in this embodiment as described below, the difficulty of the synthesizing process is greater when the placed document is offset vertically to the platen surface from a reference position than when there is no offset vertically to the platen surface. As a result, synthesizing with deviation perpendicular to the platen surface corrected in a detailed image scanned at high resolution is more difficult than in an image scanned at low resolution. Executing a process with a high degree of difficulty can therefore be avoided if the highest resolution that can be set by the user when reading light from a placed document is lower than the highest resolution that can be set by the user when reading light from a conveyed document. As a result, when reading light from a placed document, the document can be scanned using a method in which the effect of offset of the document perpendicularly to the scanning platen is less than when reading light from a conveyed document.

If the paper feed method is determined to be by ADF in step S120, the control unit 13 executes a first process, which is a process for reading conveyed documents, from step S135. More specifically, the control unit 13 measures the merging mark using resolution A as the resolution of the photoelectric conversion elements (step S135). That is, before scanning the document, the control unit 13 controls the first switching unit 51 (and the second switching unit 52 in the case of duplex scanning) to set the merging mark plate M to the exposure position.

More specifically, the control unit 13 outputs a control signal to the first switching unit 51 to rotate the first switching unit 51 so that the merging mark plate M is at the exposure position and the merging mark surface of the merging mark plate M is facing up on the Z-axis. When the merging mark plate M is at the exposure position R, the control unit 13 controls the first light source 31 to emit light to the merging mark plate M. The control unit 13 controls the switches so that the first switch SW11 and second switch SW21 respectively turn on and off, and repeats this switching operation one photoelectric conversion element at a time. As a result, the result of reading the merging mark plate M at resolution A is output from the plural line sensors of the first sensor 21.

Next, the generator 11 identifies the photoelectric conversion elements that read the same position (step S140). For example, using the example in FIG. 5, the generator 11 identifies photoelectric conversion elements E5, E6 of the first line sensor 21a1, and photoelectric conversion elements E4, E5 of second line sensor 21a2, as the photoelectric conversion elements reading the same position. The generator 11 executes the same process for each line sensor, and identifies the photoelectric conversion elements in each line sensor that read the same position.

Next, the control unit 13 prepares to scan in groups (cycles) of n using the n photoelectric conversion elements appropriate to the relative positions (step S145). More specifically, the control unit 13 configures operation of the first switch and second switch to synthesize the output of the n elements identified in step S140 as the output for one pixel, and synthesize the outputs in groups of n including the n elements at said relative positions. For example, in the example in FIG. 9, the control unit 13 configures the switches to synthesize the outputs of photoelectric conversion elements E4, E5 of second line sensor 21a2.

Note that if n=1, step S145 is effectively omitted.

Next, the control unit 13 sets the black level and white level (step S150). That is, the control unit 13, based on the white level measured in step S105 and black level measured in step S110, sets the white level and black level for each photoelectric conversion element. More specifically, based on the white level measured in step S105 and black level measured in step S110, the control unit 13 sets the gain to enable measuring gradations between the white level and black level in the effective detection range.

Figure 12:
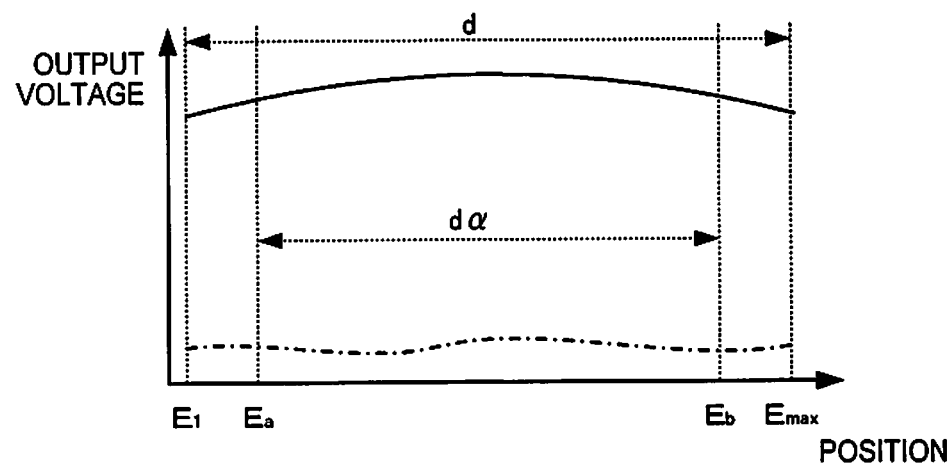
FIG. 12 illustrates gain control.

FIG. 12 schematically illustrates the white level measured in step S105 and the black level measured in step S110, the measured white level indicated by the solid line and the measured black level indicated by the dot-dash line. In this example, the first photoelectric conversion element from one end of the line sensor is E1, and the photoelectric conversion element at the other end of the line sensor is Emax. In this example, the outputs of the photoelectric conversion elements that read the same merging mark in adjacent line sensors are combined, and the output of the photoelectric conversion elements at the ends of the line sensors are not used to generate image data.

The photoelectric conversion elements used to generate image data are referred to below as the photoelectric conversion elements present in the effective detection range. In the example shown in FIG. 12, the photoelectric conversion elements between photoelectric conversion elements Ea, Eb are the photoelectric conversion elements present in the effective detection range. The white level and black level are set for each of the elements between photoelectric conversion elements Ea, Eb, and are not set for photoelectric conversion elements outside the effective detection range. Therefore, in a line sensor in which the dynamic range drops at the ends of the line sensor as in the example in FIG. 12, scanning is possible without using the ends where the dynamic range drops.

Next, the control unit 13 scans the document (step S155). More specifically, the control unit 13 controls the first switching unit 51 (and the second switching unit 52 in the case of duplex scanning) to set the white calibration plate W to the exposure position, and controls the first light source 31 to turn the light source on. The control unit 13 also outputs a control signal to the conveyance device 40 to convey the conveyed document through the conveyance path. When the conveyed document reaches the exposure position on the conveyance path, the control unit 13 controls the first sensor 21 to execute specific steps, including a reset, and scan the document. As a result, the read results are sequentially output from each line sensor of the first sensor 21. Note that depending on the type of document, the black calibration plate B may be set to the exposure position instead of the white calibration plate W.

Next, the generator 11 merges the outputs read in step S155 (step S160). More specifically, for each line, the generator 11 executes the process of generating image data for one line from the output after processes such as shading correction of the photoelectric conversion elements based on the position identified in step S140, and by repeating generating image data for the specified number of lines, generates image data representing the result of reading the conveyed document. Next, the control unit 13 outputs the image data (step S165). More specifically, the control unit 13 outputs the image data through the communicator 70 to the computer 90.

When scanning a placed document, the control unit 13 sets the white level and black level in step S170, but the effective detection range is not considered for this setting. More specifically, because merging using merging marks is not applied when scanning a placed document, the effective detection range is not defined when scanning a placed document, and the control unit 13 sets the white level and black level for all photoelectric conversion elements based on the white level measured in step S105 and black level measured in step S110.

Next, the control unit 13 scans the document (step S175). More specifically, the control unit 13 controls the first light source 31 to turn the light source on. The control unit 13 then outputs a control signal to the sub-scanning device 41, and controls the first sensor 21 to execute specific steps such as a reset and scan the document while moving the first sensor 21, first light source 31, and first optical unit 61 in the sub-scanning direction. As a result, the read results are sequentially output from the line sensors of the first sensor 21.

Next, the generator 11 merges the outputs reads in step S175 (step S180). More specifically, the generator 11 arranges the output of each line sensor after shading correction or other processing in the sub-scanning direction, and acquires an area detection image. As a result, the outputs of the line sensors are acquired as an area detection image for each line sensor. The generator 11 then finds an image of the same position in the document by image analysis, such as feature extraction based on the area detection images of adjacent line sensors, and merges the area detection images of each line sensor so that the same positions overlap. Next, the control unit 13 outputs the image data (step S185). More specifically, the control unit 13 outputs the image data through the communicator 70 to the computer 90.

The effect of vertical separation of the document from the platen surface may vary according to the synthesizing method that is used, and a synthesizing method that uses a merging mark may be considered a method in which the effect of such document deviation is great. More specifically, when the document may separate vertically from the platen surface when the document is scanned, and the amount of said separation may vary, synthesizing based on a merging mark is difficult. This is because if the document is separated vertically from the platen surface, and the merging mark is in an area where the amount of separation changes gradually, there is a strong possibility that there is not enough information to identify the correct synthesizing position based only on the merging mark. In this embodiment of the invention, therefore, output is synthesized using the merging mark when scanning a conveyed document (step S135, S160), and output is synthesized without using the merging mark when scanning a placed document (step S180). Scanning can therefore proceed using a method that is less affected by vertical separation of the document from the platen surface when scanning a placed document than when scanning a conveyed document.

Furthermore, this embodiment of the invention can be understood as a configuration that generates image data through a process that takes longer when reading light from a placed document than when reading light from a conveyed document. More specifically, because the placed document may be offset perpendicularly to the platen surface from the reference position when reading light from a placed document, processing is required to enable synthesizing correctly even though the position is offset. However, when reading light from a conveyed document, synthesizing is possible with a simple method because there is no need to consider offset of the document perpendicularly to the platen surface from the reference position.

To scan a placed document, this embodiment of the invention accumulates output for multiple lines, and based on feature extraction of the area detection image, executes an image process that identifies the position where the area detection images overlap.

When scanning a conveyed document, however, the photoelectric conversion elements reading the same position are identified based on a merging mark, and merging is possible by superimposing those photoelectric conversion elements. Therefore, image data for one line can be generated immediately from the output of the line sensors. Processing when reading light from a placed document can therefore be said to take longer than when reading light from a conveyed document.

In this embodiment of the invention, the first switching unit 51 (and second switching unit 52) can change whether the merging mark plate M, white calibration plate W, or black calibration plate B is set to the exposure position. With this configuration there is no need to move parts other than the first switching unit 51 (and second switching unit 52), such as the first optical unit 61, and the merging mark plate M, white calibration plate W, and black calibration plate B can be read by driving (moving) only a switching unit.

Furthermore, in this embodiment, the merging mark plate M is located in the sub-scanning direction between the white calibration plate W and black calibration plate B. More specifically, the first switching unit 51 (and second switching unit 52) is fan-shaped in section on the X-Z plane and can pivot on an axis extending in the main scanning direction.

A white calibration plate W, merging mark plate M, and black calibration plate B (or black calibration plate B, merging mark plate M, white calibration plate W) are disposed in the same order to the outside of the fan-shaped member. When seen from the exposure position R parallel to the sub-scanning direction (X-axis) in FIG. 11, rotation of the first switching unit 51 changes the member that is opposite the exposure position R sequentially from the white calibration plate W to the merging mark plate M and then the black calibration plate B (or the opposite order).

The merging mark formed on the merging mark plate M is disposed to a common position that is read by different line sensors, and is disposed in line with the line sensors (main scanning direction) so that it is read by the end of each line sensor. Because the merging mark is read by each photoelectric conversion element, and parts where the merging mark is present and is not present must be differentiated, the merging mark may be lines or other shape.

With this type of merging mark, the location of the merging mark is important, and if the merging mark surface is not parallel to the scanning platen T, for example, and the position of the merging mark is offset from the design position in the main scanning direction, sub-scanning direction, or Z-axis, accurate image synthesis may be difficult. For example, if the merging mark is offset on the Z-axis, reading the merging mark within the depth of field of the first optical unit 61 (and second optical unit 62) may not be possible in some cases.

In this embodiment of the invention, however, the merging mark plate M is located between the white calibration plate W and black calibration plate B. Therefore, when the white calibration plate W and black calibration plate B are switched by the merging mark plate moving in the sub-scanning direction near exposure position R, the merging mark surface of the merging mark plate M can go parallel to a line through the exposure position R (the plane of the platen surface). Therefore, even if the installation precision of the merging mark plate M to the first switching unit 51 is low, the merging mark can be accurately adjusted to the scanning position by adjusting rotation of the first switching unit 51.

However, if configured so that the white calibration surface of the white calibration plate W is set to the exposure position by moving the first switching unit 51 to one end of the range of movement (rotating the first switching unit 51 until it contacts the stopper 51*a*), and the black calibration surface of the black calibration plate B is set to the exposure position by moving the first switching unit 51 to the other end of the range of movement (rotating the first switching unit 51 until it contacts the stopper 51*a*), even if the position, angle, orientation or other aspect of the switching unit when moved to an end of the range of movement differs from the expected design state, shading can be measured without being affected. In addition, by moving the first switching unit 51 to one end of the range of movement (rotating the first switching unit 51 until it contacts the stopper 51*a*), the position on the white calibration plate W or black calibration plate B that is read can be fixed. More specifically, because the white calibration plate W and black calibration plate B are monochrome surfaces, unlike the merging mark, shading can be measured and documents can be scanned without being affected by the position, angle, or orientation of the calibration plate.

(5) Number of Line Sensors

A scanner 1 according to this embodiment acquires image data for one line of a document by segmenting and reducing the image of one line of the document by the first optical unit 61 (and second optical unit 62), sensing by multiple line sensors, and synthesizing line sensor output. The number of line sensors in this configuration is not specifically limited, and the number of line sensors may be desirably adjusted according to the size of the documents to scan and other conditions.

In one example, suppose a configuration for scanning A4 size documents. This configuration is embodied by configuring the conveyance device 40 to convey at least A4 documents and enable placing at least A4 documents on the scanning platen T. The number of line sensors appropriate to an A4 size document may be the number of line sensors in a scanner 1 configuration enabling scanning documents of a maximum A4 size, or a number of line sensors used to scan an A4 document in a configuration capable of scanning documents larger than A4.

In a configuration that splits light from the document into multiple parts and guides the multiple light beams through an optical unit to the line sensor, if the document scanning resolution is S and the resolution of the photoelectric conversion elements in the line sensor is A, S/A is the minimum reduction ratio of the first optical unit 61 (and second optical unit 62). This is because if images are reduced to a reduction ratio less than S/A, one pixel at scanning resolution S cannot be read by one photoelectric conversion element of the line sensor, and the document scanning resolution is meaningless in practice.

Therefore, to achieve a document scanning resolution S using a line sensor with the photoelectric conversion elements disposed at resolution A, the maximum reduction is a reduction ratio S/A, and the actual reduction ratio f must be S/A or greater (high absolute value).

If the length of one line of the document (in the main scanning direction) is L inches; the length in the line direction of the part of one line sensor where the photoelectric conversion elements are disposed is d inches (see FIG. 4); and supposing scanning in an effective detection range (between photoelectric conversion elements Ea, Eb in FIG. 12) equal to ratio α (<1) of the d inch size of one line sensor in the line direction, the number of line sensors required to scan a document L inches wide is Lf/dα.

The maximum reduction ratio f of reduction by the first optical unit 61 is 1.

By using 8.3" (which is the width of an A4 document (length is 11.7")) as the length L of one line, 1 as the maximum reduction ratio f, 0.72 as the typical size d of a line sensor, and a ratio α=2/3, the number of line sensors Lf/dα required to scan an A4 document is known to be approximately 17. If the scanner is configured with fewer than 17, that is, 16 or fewer line sensors, a scanner capable of scanning A4 documents with multiple line sensors can be configured without using excessive line sensors.

Likewise, the number of line sensors required to scan an A3 document can be calculated by using 11.7" (which is the width of an A3 document (length is 16.5")) as the length L of one line, 1 as the maximum reduction ratio f, 0.72 as the typical size d of a line sensor, and a ratio α=2/3 as the ratio α for extra tolerance. To provide extra tolerance for skew to accommodate the size difference between an A4 document and an A3 document, the number of line sensors is approximately 25. If the scanner is configured with fewer than 25, that is, 24 or fewer line sensors, a scanner capable of scanning A3 documents with multiple line sensors can be configured without using excessive line sensors.

Table 1 and Table 2 show specific examples of the number of sensors Lf/dα calculated using specific values substituted for the reduction ratio f, minimum fmin of reduction ratio f, scanning resolution S, photoelectric conversion element resolution A, sensor size d, ratio α, effective detection range dα, and document width L. In Table 1, document size L is 8.3 (that is, A4), and in Table 2 document size is 11.6 (that is, A3). In Table 2, Lf/dα+2/3 is the number of line sensors to provide a margin of 1/3 on each side so that the line sensors at both sides in the main scanning direction (locations Se in FIG. 4) can read the document even if the document is skewed.

TABLE 1

| Index number | Lf/dα | f | fmin | S | A | d | α | dα | L |
|---|---|---|---|---|---|---|---|---|---|
| 1 | 17.29 | 1 | 1 | 600 | 600 | 0.72 | 0.667 | 0.48 | 8.3 |
| 2 | 8.65 | 0.5 | 0.5 | 600 | 1200 | 0.72 | 0.667 | 0.48 | 8.3 |
| 3 | 12.97 | 0.75 | 0.5 | 600 | 1200 | 0.72 | 0.667 | 0.48 | 8.3 |
| 4 | 15.56 | 0.9 | 0.5 | 600 | 1200 | 0.72 | 0.667 | 0.48 | 8.3 |
| 5 | 4.32 | 0.25 | 0.25 | 600 | 2400 | 0.72 | 0.667 | 0.48 | 8.3 |
| 6 | 8.65 | 0.5 | 0.25 | 600 | 2400 | 0.72 | 0.667 | 0.48 | 8.3 |
| 7 | 12.97 | 0.75 | 0.25 | 600 | 2400 | 0.72 | 0.667 | 0.48 | 8.3 |
| 8 | 15.56 | 0.9 | 0.25 | 600 | 2400 | 0.72 | 0.667 | 0.48 | 8.3 |
| 9 | 15.37 | 1 | 0.5 | 600 | 1200 | 072 | 0.75 | 0.54 | 8.3 |
| 10 | 14.41 | 1 | 0.5 | 600 | 1200 | 0.72 | 0.8 | 0.578 | 8.3 |
| 11 | 11.53 | 1 | 0.5 | 600 | 1200 | 0.72 | 1 | 0.72 | 8.3 |
| 12 | 7.69 | 1 | 0.5 | 600 | 1200 | 1.44 | 0.75 | 1.08 | 8.3 |
| 13 | 12.97 | 0.75 | 0.5 | 600 | 1200 | 0.72 | 0.667 | 0.48 | 8.3 |
| 14 | 6.48 | 0.75 | 0.5 | 600 | 1200 | 1.44 | 0.667 | 0.96 | 8.3 |
| 15 | 12.97 | 0.5 | 0.5 | 600 | 1200 | 0.48 | 0.667 | 0.32 | 8.3 |
| 16 | 12.35 | 0.75 | 0.5 | 600 | 1200 | 0.72 | 0.7 | 0.504 | 8.3 |
| 17 | 10.81 | 0.75 | 0.5 | 600 | 1200 | 0.72 | 0.8 | 0.576 | 8.3 |
| 18 | 9.61 | 0.75 | 0.5 | 600 | 1200 | 0.72 | 0.9 | 0.648 | 8.3 |
| 19 | 9.10 | 0.75 | 0.5 | 600 | 1200 | 0.72 | 0.95 | 0.684 | 9.3 |

TABLE 2

| Index number | Lf/dα | Lf/dα + 2/3 | f | fmin | S | A | d | α | dα | L |
|---|---|---|---|---|---|---|---|---|---|---|
| 1 | 24.38 | 25.04 | 1 | 1 | 600 | 600 | 0.72 | 0.667 | 0.48 | 11.7 |
| 2 | 12.19 | 12.85 | 0.5 | 0.5 | 600 | 1200 | 0.72 | 0.667 | 0.48 | 11.7 |
| 3 | 18.28 | 18.95 | 0.75 | 0.5 | 600 | 1200 | 0.72 | 0.667 | 0.48 | 11.7 |
| 4 | 21.94 | 22.60 | 0.9 | 0.5 | 600 | 1200 | 0.72 | 0.667 | 0.48 | 11.7 |
| 5 | 6.09 | 6.76 | 0.25 | 0.25 | 600 | 2400 | 0.72 | 0.667 | 0.48 | 11.7 |
| 6 | 12.19 | 12.85 | 0.5 | 0.25 | 600 | 2400 | 0.72 | 0.667 | 0.48 | 11.7 |
| 7 | 18.28 | 18.95 | 0.75 | 0.25 | 600 | 2400 | 0.72 | 0.667 | 0.48 | 11.7 |
| 8 | 21.94 | 22.60 | 0.9 | 0.25 | 600 | 2400 | 0.72 | 0.667 | 0.48 | 11.7 |
| 9 | 21.67 | 22.33 | 1 | 0.5 | 600 | 1200 | 0.72 | 0.75 | 0.54 | 11.7 |
| 10 | 20.31 | 20.98 | 1 | 0.5 | 600 | 1200 | 0.72 | 0.8 | 0.576 | 11.7 |
| 11 | 16.25 | 16.92 | 1 | 0.5 | 600 | 1200 | 0.72 | 1 | 0.72 | 11.7 |
| 12 | 10.83 | 11.50 | 1 | 0.5 | 600 | 1200 | 1.44 | 0.75 | 1.08 | 11.7 |
| 13 | 18.28 | 18.95 | 0.75 | 0.5 | 600 | 1200 | 0.72 | 0.667 | 0.48 | 11.7 |
| 14 | 9.14 | 9.81 | 0.75 | 0.5 | 600 | 1200 | 1.44 | 0.667 | 0.96 | 11.7 |
| 15 | 18.28 | 18.95 | 0.5 | 0.5 | 600 | 1200 | 0.48 | 0.667 | 0.32 | 11.7 |
| 16 | 17.41 | 18.08 | 0.75 | 0.5 | 600 | 1200 | 0.72 | 0.7 | 0.504 | 11.7 |
| 17 | 15.23 | 15.90 | 0.75 | 0.5 | 600 | 1200 | 0.72 | 0.8 | 0.576 | 11.7 |

TABLE 2-continued

| Index number | Lf/dα | Lf/dα + 2/3 | f | fmin | S | A | d | α | dα | L |
|---|---|---|---|---|---|---|---|---|---|---|
| 18 | 13.54 | 14.21 | 0.75 | 0.5 | 600 | 1200 | 0.72 | 0.9 | 0.648 | 11.7 |
| 19 | 12.83 | 13.50 | 0.75 | 0.5 | 600 | 1200 | 0.72 | 0.95 | 0.684 | 11.7 |

In Table 1 and Table 2, example 1 is an example in which the number of line sensors is approximately 17 as described above. Examples 2 to 8 show the number of line sensors when the sensor size d, ratio α, and scanning resolution S are constant, the resolution A of the photoelectric conversion elements is a constant 1200 dpi or 2400 dpi, and the reduction ratio f changes from the minimum fmin to 1. As shown in these examples, reducing the reduction ratio f can reduce the number of line sensors.

Examples 9 to 12 show the number of line sensors when the reduction ratio f, scanning resolution S, and the resolution A of the photoelectric conversion elements are constant, and the sensor size d and ratio α vary.

Examples 13 to 15 show the number of line sensors when the scanning resolution S, the resolution A of the photoelectric conversion elements, and ratio α are constant, and the sensor size d and reduction ratio f vary.

Examples 16 to 19 show the number of line sensors when the reduction ratio f, scanning resolution S, the resolution A of the photoelectric conversion elements, and the sensor size d are constant, and ratio α varies.

As shown in these examples, the number of line sensors can be decreased as ratio α increases. The number of line sensors can also be reduced as the sensor size d increases.

The length of the effective detection range dα of one line sensor in the line direction of the line sensor may be 0.54" or greater. More specifically, if the size of the line sensor in the line direction is d inches, and an area equal to ratio α (<1) of the line sensor is scanned, the effective detection range is dα. If the maximum reduction ratio f in the number of line sensors formula Lf/dα is 1, the effective detection range dα is 0.54, and the width of an A4 document is substituted for L, the number of line sensors is approximately 15.

To provide the line sensor with a scanning margin for reading to the edges of the width of an A4 document so that the line sensor can read one full line with no loss at the edges, the number of line sensors is 16 (example 9 in Table 1). Therefore, because the number of line sensors is the maximum of 16 if the effective detection range dα is 0.54, one line of the image can be read with no loss using 16 or fewer line sensors if the effective detection range dα is greater than or equal to 0.54". This relationship also applies when L is the size of an A3 document, for which if 23 or fewer line sensors are used for scanning, the effective detection range dα is preferably 0.54" or greater (example 9 in Table 2).

The number of line sensors may also be determined to help reduce the size of the scanner 1. In a configuration that splits light from the document into multiple parts guided by the first optical unit 61 (and second optical unit 62) to the line sensors, one line can be read by compressing and guiding the light from the document to the line sensors. Note that the above first optical unit 61 (and second optical unit 62) is configured to compress and guide light from the document to the line sensors, but may be configured to spread and guide light from the document to the line sensors.

If the enlargement or reduction ratio of the optical unit is f, the size of the document in the line direction (main scanning direction) is L inches, the size of the sensor in the main scanning direction is d inches, and the ratio covered by each sensor is a (<1), the number of line sensors required to scan a document L inches wide is, as described above, Lf/dα. If the image is changed by magnification 1 by the optical unit from the document to the line sensor, there is no enlargement or reduction, but in this case using multiple line sensors has no meaning. As a result, when multiple line sensors are used, ratio f is normally not 1.

If ratio f is less than 1, the document image is reduced, and if the ratio f is greater than 1, the document image is enlarged. In general, the length of the light path at ratio 1 is short, and if the image is enlarged or reduced, the length of the light path is longer than the light path of ratio 1. The light path is therefore as short as possible to reduce device size, and the ratio is desirably close to 1. However, if the light path has a fixed, short length, the reduction ratio and enlargement ratio are fixed at a value near 1, and the length of the effective detection range required for detection in the line direction of the line sensor is fixed.

If a line sensor of a specific length d is used, and the length of the effective detection range dα is constant, the number of line sensors changes if the ratio α is changed. Because the number of line sensors is Lf/dα, when ratio α changes, ratio α increases as the number of line sensors decreases. If ratio α increases (for example, if a is close to 1), the tolerance for error when installing the line sensors decreases, manufacturing is more difficult, and production yield drops. However, if the number of line sensors is increased, ratio α can be reduced, and assembly (production) becomes easier.

If increasing the number of line sensors is allowed, the light path can be shortened, device size reduced, and a scanner 1 enabling easier assembly of the line sensors can be provided. More specifically, by using 8.3" (which is the width of an A4 document (length is 11.7")) as the length L of one line, 1 as the reduction ratio f, 0.72 as the typical size d of a line sensor, and α=2/3 as ratio α, the number of line sensors Lf/dα is approximately 18 by dropping the decimal and rounding up.

Therefore, by configuring the scanner using 18 or more line sensors, a scanner in which multiple line sensors can be assembled with a greater degree of freedom can be provided. Furthermore, if the number of line sensors Lf/dα increases, a ratio f closer to 1 can be easily achieved, there is no need to configure the optical unit with an excessively long light path, and the size of the scanner can be easily reduced.

Likewise, by using 11.7" (which is the width of an A3 document (length is 16.5")) as the length L of one line, 1 as the maximum reduction ratio f, 0.72 as the typical size d of a line sensor, and a ratio α=2/3 as the ratio α for extra tolerance, the number of line sensors Lf/dα is approximately 25 by dropping the decimal and rounding up.

Therefore, by configuring the scanner using 25 or more line sensors, a scanner in which multiple line sensors can be assembled with a greater degree of freedom can be provided.

Furthermore, if the number of line sensors Lf/dα increases, a ratio f closer to 1 can be easily achieved, there is no need to configure the optical unit with an excessively long light path, and the size of the scanner can be easily reduced.

A configuration in which the length of the effective detection range per one line sensor in the line direction of the line sensor is 0.48" or less is also conceivable. More specifically, if a ratio f=1, effective detection range dα=0.48, and the size L of an A4 document are substituted into the line sensor formula Lf/dα, the number of line sensors is approximately 18. In the case of an A4 document, therefore, if effective detection range dα is 0.48 or less, the document can be scanned using 18 or more line sensors.

This relationship also applies when L is the width of an A3 document, and if effective detection range dα is 0.48 or less, documents can be scanned using 24 or more line sensors.

Examples 2 to 6 in Table 3 show the number of line sensors for an A4 document when the effective detection range dα is 0.48 or less, and examples 7 to 12 show the number of line sensors for an A3 document when the effective detection range dα is 0.48 or less. Examples 13 and 14 are examples where α=0.5, and d=0.72, and in these examples, an A4 document can be scanned using 24 or more line sensors, and an A3 document can be scanned using 33 or more line sensors.

combining and synthesizing the outputs of individual photoelectric conversion elements by controlling a first switch and second switch may be used.

When synthesizing the outputs of n photoelectric conversion elements in the embodiment described above, the circuits corresponding to the photoelectric conversion elements located at the extreme ends are driven to output, but circuits at any desired position may be made to output. For example, when the outputs of photoelectric conversion elements 1 to 3 are synthesized, the synthesized result may be output from the noise cancellation circuits corresponding to elements 2 and 3 instead of the circuit corresponding to element 1.

The photoelectric conversion elements are also not limited to being disposed to a single sensor chip. The photoelectric conversion elements may be configured in multiple rows, or form an area sensor. The photoelectric conversion elements may also all be the same, or may be photoelectric conversion elements corresponding to different colors by providing color filters, for example. For example, there may be three rows of photoelectric conversion elements, including a row of R photoelectric conversion elements, a row of G photoelectric conversion elements, and a row of B photoelectric conversion elements.

TABLE 3

| Index number | Lf/dα | Lf/dα + 2/3 | f | fmin | S | A | d | α | dα | L |
|---|---|---|---|---|---|---|---|---|---|---|
| 1 | 17.2916667 | 17.96 | 1 | 1 | 600 | 600 | 0.72 | 0.667 | 0.48 | 8.3 |
| 2 | 17.46633 | 18.13 | 1 | 0.5 | 600 | 1200 | 0.72 | 0.66 | 0.475 | 8.3 |
| 3 | 19.212963 | 19.88 | 1 | 0.5 | 600 | 1200 | 0.72 | 0.6 | 0.432 | 8.3 |
| 4 | 19.212963 | 19.88 | 1 | 0.5 | 600 | 1200 | 0.48 | 0.9 | 0.432 | 8.3 |
| 5 | 21.6145833 | 22.28 | 1 | 0.5 | 600 | 1200 | 0.48 | 0.8 | 0.384 | 8.3 |
| 6 | 25.617284 | 26.28 | 1 | 0.5 | 600 | 1200 | 0.36 | 0.9 | 0.324 | 8.3 |
| 7 | 24.375 | 25.04 | 1 | 1 | 600 | 600 | 0.72 | 0.667 | 0.48 | 11.7 |
| 8 | 24.6212121 | 25.29 | 1 | 0.5 | 600 | 1200 | 0.72 | 0.66 | 0.475 | 11.7 |
| 9 | 27.0833333 | 27.75 | 1 | 0.5 | 600 | 1200 | 0.72 | 0.6 | 0.432 | 11.7 |
| 10 | 27.0833333 | 27.75 | 1 | 0.5 | 600 | 1200 | 0.48 | 0.9 | 0.432 | 11.7 |
| 11 | 30.46875 | 31.14 | 1 | 0.5 | 600 | 1200 | 0.48 | 0.8 | 0.384 | 11.7 |
| 12 | 36.1111111 | 36.78 | 1 | 0.5 | 600 | 1200 | 0.36 | 0.9 | 0.324 | 11.7 |
| 13 | 23.0555556 | 23.72 | 1 | 1 | 600 | 600 | 0.72 | 0.5 | 0.36 | 8.3 |
| 14 | 32.5 | 33.17 | 1 | 1 | 600 | 600 | 0.72 | 0.5 | 0.36 | 11.7 |

(6) Other Embodiments

The invention is described with reference to desirable embodiments above, but the invention is not so limited and can be varied in many ways. For example, the scanner described above may be a component of a multifunction device, which is an electronic device that is also used for other purposes.

The merging mark may also be configured in many ways, and may be two lines or graphic of another shape. During synthesis, images may also be synthesized to eliminate deviation (such as skewing) of the line sensors in the sub-scanning direction.

To superimpose the outputs of photoelectric conversion elements that read the same part of the document, a statistical value (such as the average) of image data from one line sensor and image data from the other line sensor may be acquired and used, or the image data from one of the line sensors may be used.

The circuit shown in FIG. 7 is also only an example. For example, the noise cancellation circuit may be omitted, or a different circuit configuration may be used to remove noise. In any case, any desirable configuration enabling desirably The method of generating image data by synthesizing first image data that a first line sensor outputs and second image data that a second line sensor outputs may also be embodied as an invention of a method or an invention of an image data generating method.

A gray calibration plate or a calibration plate of another color may also be used instead of at least one of the black calibration plate B and white calibration plate W.

Various shapes may also be used for the switching unit. For example, the switching unit may be configured to switch between only two calibration plates, such as the white calibration plate W (or a gray calibration plate, for example) and the merging mark plate M.

Further alternatively, a configuration omitting the first switching unit 51, disposing a calibration plate and merging mark plate M to the scanning platen T, and moving the first unit U1 to the position of and reading the calibration plate or merging mark plate M, is also conceivable.

Furthermore, a shape that in section parallel to the X-Z plane is fan-shaped as shown in FIG. 11, or a shape that in section parallel to the X-Z plane is a polygon, may be used. The mechanism for switching the merging mark plate M is also not limited to a member attached to a rotary axis.

Figure 13:
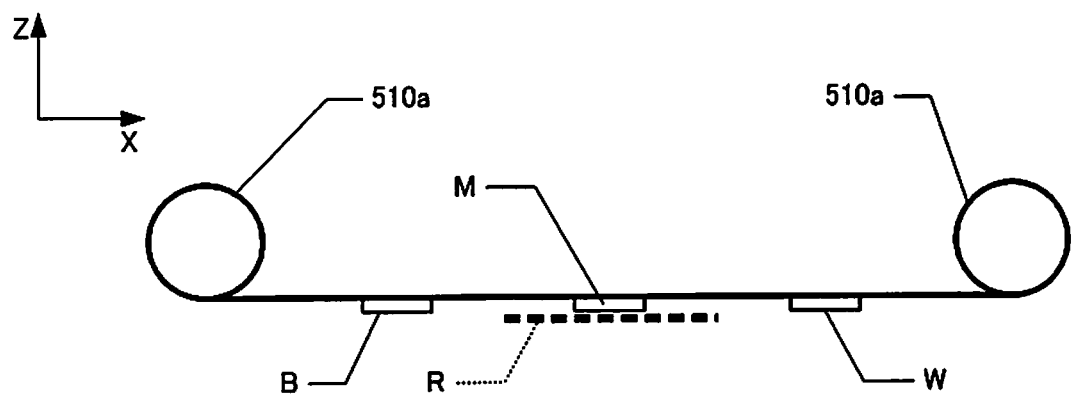
FIG. 13 illustrates the configuration of the switching unit.

FIG. 13 shows a switching unit that moves a black calibration plate B, merging mark plate M, and white calibration plate W attached to a belt bidirectionally in the sub-scanning direction by means of rollers 510a. By controlling rotation of the rollers 510a, this switching unit can selectively switch between the black calibration plate B, merging mark plate M, and white calibration plate W as the member that is set to the exposure position R. In this case, the white calibration plate W is preferably disposed to the exposure position R when the rollers 510a turn to the clockwise limit in FIG. 13, and the black calibration plate B is disposed to the exposure position R when the rollers 510a turn to the counterclockwise limit in FIG. 13.

The method in which the effect of document deviations is small may be configured as at least one of a scanning method in which the amount of light output by the light source is relatively great, and a scanning method in which the reflection angle at which light from the light source is reflected from the document is relatively small. More specifically, when reading light from a placed document, scanning may be by a scanning method in which the amount of light output by the light source is relatively greater than when reading light from a conveyed document.

This configuration can be achieved by a configuration in which the amount of light output by the first optical unit 61 can be changed as controlled by the control unit 13 in the configuration shown in FIG. 1, and the amount of light is less when a placed document is scanned than when a conveyed document is scanned. If the amount of light output by the light source increases (except when the amount of light is excessively great), the image can be read with greater contrast than when the amount of light is low, and scanning with high image quality is easier. Identifying from the scanned image the position to use as a reference for synthesis is therefore simplified. As a result, even in synthesis of a placed document for which a merging mark cannot be used, scanning is possible in a manner enabling easier synthesis even if the image is scanned with more light than when scanning a conveyed document.

When reading light from a placed document, the document may be scanned by a method in which the reflection angle of light from the light source by the document is relatively smaller than when reading light from a conveyed document. Of course, when reading light from a placed document, a scanning method in which the amount of light is relatively greater and the reflection angle is relatively smaller than when reading light from a conveyed document may be used.

This configuration can be achieved by a configuration wherein, for example, the scanner 1 shown in FIG. 1 has a mechanism that can change the position and reflection angle β (see FIG. 3) of the first light source 31 to the document P. More specifically, by the control unit 13 controlling said mechanism, the reflection angle can be adjusted to a smaller angle when reading light from a placed document than when reading light from a conveyed document. Note that reflection angle β is 1/2 the angle between the light output by the first light source 31 and the light travelling toward the line sensor 21a (that is, the reflection angle supposing specular reflection of the light from the first light source 31 by the document P).

If the reflection angle β is decreased by control by the control unit 13, the direction of light emitted to the same position of the document, and the direction of light reflected from the same position, become closer, and an optical unit with a deep depth of field can be easily formed. By reducing the reflection angle at which light from the light source is reflected by the document, light can be emitted so that focusing is easier even if the document is offset, and the effect of document offset can be reduced. Of course, the configuration for changing the reflection angle of light from the document when scanning a placed document and when scanning a conveyed document may be variously configured, and the placed document scanning unit and conveyed document scanning unit may be configured as separate units.

In the foregoing embodiments, the document scanning resolution specified by the user is limited to a scanning resolution that can be used when reading light from a conveyed document, but the invention is not so limited.

For example, the user may made to specify using the ADF or using the document platen. If the ADF is specified, this configuration may also enable the user to specify the scanning resolution from among the scanning resolutions that can be used to scan a conveyed document. Conversely, if using the document platen, is specified, the configuration may enable the user to specify a scanning resolution from among the scanning resolutions that can be used to scan a placed document (a lower maxim scanning resolution than when the ADF is used). In this case, steps S125 and S130 in the flow chart in FIG. 10 can be omitted.

Image data generated by scanning may be output to a computer 90, output and stored to a storage medium such as USB memory installed to the device, output to a print mechanism and printed (or copied), or output and displayed on a monitor.

Alternatively, the final image data may be generated by outputting an area detection image to a computer 90, and applying image analysis and synthesis by a driver program or application program of the computer 90. In this configuration, the computer 90 may be considered part of the scanner.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A scanner comprising:
   multiple sensor chips;
   an optical unit that reduces and focuses an image of a document on the sensor chips;
   a generator that synthesizes images of the document read by the sensor chips, and generates image data; and
   a switching unit that can change between and set to the exposure position, to which light from a light source is emitted on the conveyance path of the document, a merging mark surface having a merging mark used as a reference for image synthesis, and a white calibration surface used as a white reference;
   the generator synthesizing images based on sensor chip output when the merging mark surface is at the exposure position, and
   correcting output of the sensor chip based on sensor chip output when the white calibration surface is at the exposure position.

2. The scanner described in claim 1, wherein:
   the switching unit can change between and set to the exposure position the merging mark surface, white calibration surface, or a black calibration surface used as a black reference.

3. The scanner described in claim 2, wherein:
the merging mark surface is located in the sub-scanning direction between the white calibration surface and the black calibration surface.

4. The scanner described in claim 1, wherein:
the multiple sensor chips includes sixteen or fewer sensor chips that are disposed substantially in line across a full length of a document in a line direction;
the optical unit reduces and focuses an image of an A4 document on the sixteen or fewer sensor chips; and
the generator synthesizes images of the A4 document read by the sensor chips, and generates image data.

5. The scanner described in claim 4, wherein:
an A4 document is scanned using twelve or fewer sensor chips.

6. The scanner described in claim 5, wherein:
an A4 document is scanned using eight or fewer sensor chips.

7. The scanner described in claim 1, wherein:
the multiple sensor chips includes 24 or fewer sensor chips that are disposed substantially in line across a full length of a document in a line direction;
the optical unit reduces and focuses an image of an A3 document on the 24 or fewer sensor chips; and
the generator synthesizes images of the A3 document read by the sensor chips, and generates image data.

8. The scanner described in claim 7, wherein:
an A3 document is scanned using eighteen or fewer sensor chips.

9. The scanner described in claim 8, wherein:
an A3 document is scanned using twelve or fewer sensor chips.

10. The scanner described in claim 4, wherein:
the length of the effective detection range per one sensor chip in the line direction of the sensor chip is 0.54 inch or greater.

11. The scanner described in claim 4, wherein:
each of the multiple sensor chips are disposed with a gap therebetween.

12. The scanner described in claim 7, wherein:
each of the multiple sensor chips are disposed with a gap therebetween.

* * * * *